US012455991B2

(12) United States Patent
Horii et al.

(10) Patent No.: US 12,455,991 B2
(45) Date of Patent: Oct. 28, 2025

(54) CIRCUIT SERIALIZATION FOR PARAMETERIZED CIRCUIT SIMULATION

(71) Applicant: International Business Machines Corporation, Armonk, NY (US)

(72) Inventors: Hiroshi Horii, Tokyo (JP); Jun Doi, Yokohama (JP); Christopher James Wood, Long Island City, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 986 days.

(21) Appl. No.: 17/545,143

(22) Filed: Dec. 8, 2021

(65) Prior Publication Data
US 2023/0177232 A1    Jun. 8, 2023

(51) Int. Cl.
*G06F 30/20*    (2020.01)
*G06N 10/40*    (2022.01)

(52) U.S. Cl.
CPC ............. *G06F 30/20* (2020.01); *G06N 10/40* (2022.01)

(58) Field of Classification Search
CPC ................................ G06F 30/20; G06N 10/40
USPC ............................................................ 703/14
See application file for complete search history.

(56) References Cited

U.S. PATENT DOCUMENTS

| 7,219,017 | B2 * | 5/2007 | Vitaliano | G06N 10/70 |
| | | | | 702/22 |
| 8,913,900 | B2 * | 12/2014 | Lukin | H04B 10/90 |
| | | | | 398/176 |
| 9,443,200 | B2 * | 9/2016 | Schroff | G21K 1/003 |
| 9,779,359 | B2 * | 10/2017 | Svore | G06N 10/60 |

(Continued)

FOREIGN PATENT DOCUMENTS

| CN | 106877884 A | 6/2017 |
| CN | 109858628 A | 6/2019 |

(Continued)

OTHER PUBLICATIONS

Murg et al. (Tree Tensor Network State with Variable Tensor Order: An Efficient Multireference Method for Strongly Correlated Systems, ACS Pub. 2015, pp. 1027-1036) (Year: 2015).*

(Continued)

*Primary Examiner* — Iftekhar A Khan
(74) *Attorney, Agent, or Firm* — Amin, Turocy & Watson, LLP

(57) ABSTRACT

Techniques for circuit serialization for parameterized-circuit simulation are described. In one example, a system is provided that comprises a processor that executes computer executable components stored in memory. The computer executable components comprise a determination component that determines a first path of computational nodes and a second path of computational nodes of a parameter tree comprising a plurality of computational nodes, wherein the first path of computational nodes and the second path of (Continued)

computational nodes share one or more computational nodes at the beginning of the first path of computational nodes and the second path of computational nodes. The computer executable components further comprise a serialization component that creates a serialized path of computational nodes from the first path of computational nodes and the second path of computational nodes.

20 Claims, 12 Drawing Sheets

(56) References Cited

U.S. PATENT DOCUMENTS

| | | | | |
|---|---|---|---|---|
| 10,140,404 | B2* | 11/2018 | Rigetti | G06F 30/23 |
| 10,320,360 | B2* | 6/2019 | Wiebe | G06F 17/17 |
| 10,489,212 | B2* | 11/2019 | Smith | G06F 30/20 |
| 10,657,304 | B1* | 5/2020 | Itoko | G06F 30/327 |
| 10,832,155 | B2* | 11/2020 | Lechner | G06N 10/60 |
| 11,210,138 | B1* | 12/2021 | Campbell | G06F 9/50 |
| 11,373,114 | B1* | 6/2022 | Naveh | G06N 10/00 |
| 11,514,038 | B2* | 11/2022 | Wang | G06F 16/2453 |
| 11,727,299 | B2* | 8/2023 | Smith | G06F 9/5027 718/102 |
| 12,204,986 | B2* | 1/2025 | Coady | H04L 41/145 |
| 2006/0123363 | A1* | 6/2006 | Williams | G06N 10/20 977/839 |
| 2007/0266347 | A1* | 11/2007 | Chang | B82Y 10/00 716/103 |
| 2012/0072191 | A1* | 3/2012 | Freedman | H04L 9/0852 703/2 |
| 2013/0246495 | A1* | 9/2013 | Svore | G06N 10/60 708/491 |
| 2018/0048669 | A1* | 2/2018 | Lokamathe | G06N 5/04 |
| 2018/0181685 | A1* | 6/2018 | Roetteler | H04L 9/0643 |
| 2019/0102496 | A1* | 4/2019 | Bishop | G06F 8/34 |
| 2019/0251213 | A1* | 8/2019 | Bishop | G06N 5/01 |
| 2019/0332731 | A1* | 10/2019 | Chen | G06N 10/20 |
| 2020/0184031 | A1* | 6/2020 | Horii | G06N 10/20 |
| 2020/0218842 | A1* | 7/2020 | Itoko | G06F 30/327 |
| 2020/0249968 | A1* | 8/2020 | Quintin | G06N 10/20 |
| 2020/0401925 | A1* | 12/2020 | Hertzberg | G06F 16/9024 |
| 2021/0152189 | A1* | 5/2021 | Murali | G06N 10/20 |
| 2021/0192114 | A1* | 6/2021 | Boixo Castrillo | G06N 10/20 |
| 2021/0272010 | A1* | 9/2021 | Williams | G06F 9/5005 |
| 2023/0095631 | A1* | 3/2023 | Ganeshan | G06N 3/04 702/22 |
| 2023/0177232 | A1* | 6/2023 | Horii | G06F 30/20 703/14 |
| 2023/0289638 | A1* | 9/2023 | Peterson | G06N 10/20 |

FOREIGN PATENT DOCUMENTS

| | | |
|---|---|---|
| CN | 111915011 A | 11/2020 |
| CN | 112561068 A | 3/2021 |
| CN | 112668722 A | 4/2021 |
| CN | 113261017 A | 8/2021 |
| WO | 2021011412 A1 | 1/2021 |

OTHER PUBLICATIONS

Pan et al. (Contracting Arbitrary Tensor Networks: General Approximate Algorithm and Applications in Graphical Models and Quantum Circuit Simulations, arXiv, 2020, pp. 1-14) (Year: 2020).*

Luo et al. | "Yao.jl: Extensible, Efficient Framework for Quantum Algorithm Design". arXiv:1912.10877v3 [quant-ph], Published: Oct. 11, 2020, vol. 4, p. 341; https://doi.org/10.22331/q-2020-10-11-341, 34 pages.

International Search Report and Written Opinion received for PCT Application Serial No. PCT/CN2022/131067 dated Jan. 19, 2023, 10 pages.

* cited by examiner

CIRCUIT SERIALIZATION FOR PARAMETERIZED CIRCUIT SIMULATION

BACKGROUND

The subject disclosure relates to circuit serialization, and more specifically, to circuit serialization for parameterized-circuit simulation.

Use of parameterized circuits has great potential to address a variety of challenges involving quantum circuits. For example, parameterized circuits allow for a template circuit of computational nodes to be created which is then fed a series of parameter sets representing different circuits made of a path of computational nodes in order to simulate different circuits based on the parameter sets. This allows for a large amount of flexibility in simulations without the need to create dedicated circuits for each parameter set.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate circuit serialization for parameterized-circuit simulation are described.

According to an embodiment, a system can comprise a processor that executes computer executable components stored in memory. The computer executable components comprise a determination component that determines a first path of computational nodes and a second path of computational nodes of a parameter tree comprising a plurality of computational nodes, wherein the first path of computational nodes and the second path of computational nodes share one or more computational nodes at the beginning of the first path of computational nodes and the second path of computational nodes. The computer executable components further comprise a serialization component that creates a serialized path of computational nodes from the first path of computational nodes and the second path of computational nodes. An advantage of such a system is that it can facilitate identification of common computational nodes between the first path of computational nodes and the second path of computational nodes.

In some embodiments, the parameter tree represents a plurality of computational paths of the plurality of computational nodes in a quantum circuit. An advantage of such a system is that it facilitates identification of common computational nodes within the plurality of computational paths.

In some embodiments, the serialized path of computational nodes is created by adding one or more backwards edges from an endpoint of the first path of computational nodes to a shared computational node of the first path of computational nodes and the second path of computational nodes. An advantage of such a system is that duplicate computational nodes between the first path of computational nodes and the second path of computational nodes are removed.

According to another embodiment, a computer-implemented method can comprise determining, by a system operatively coupled to a processor, a first path of computational nodes and second path of computational nodes of a parameter tree comprising a plurality of computational nodes, wherein the first path of computational nodes and the second path of computational nodes share one or more computational nodes at the beginning of the first path of computational nodes and the second path of computational nodes. The computer-implemented method can further comprise creating, by the system, a serialized path of computational nodes from the first path of computational nodes and the second path of computational nodes. An advantage of such a computer-implemented method is that it can facilitate identification of common computational nodes between the first path of computational nodes and the second path of computational nodes.

In some embodiments, the serialized path of computational nodes is created by adding one or more backwards edges from an endpoint of the first path of computational nodes to a shared node of the first path of computational nodes and the second path of computational nodes. An advantage of such a computer-implemented method is that duplicate computational nodes between the first path of computational nodes and the second path of computational nodes are removed.

According to another embodiment, a computer program product comprising a computer readable storage medium having program instructions embodied therewith, the program instructions executable by a processor to cause the processor to determine, by the processor, a first path of computational nodes and a second path of computational nodes of a parameter tree comprising a plurality of computational nodes, wherein the first path of computational nodes and the second path of computational nodes share one or more computational nodes at the beginning of the first path of computational nodes and the second path of computational nodes. The program instructions are further executable, by the processor, to cause the processor to create, a serialized path of computational nodes from the first path of computational nodes and the second path of computational nodes. An advantage of such a computer program product is that it can facilitate identification of common computational nodes between the first path of computational nodes and the second path of computational nodes.

In some embodiments, the program instructions are further executable, by the processor, to cause the processor to create a recovery node representing a shared node between the first path of computational nodes and the second path of computational nodes. An advantage of such a computer program product is that it allows the saving of a state of the shared node between the first path of computational nodes and the second path of computational nodes.

In some embodiments, the serialized path of computational nodes is created by connecting an endpoint of the first path of computational nodes to the recovery node, wherein the recovery node is connected to the second path of computational nodes at a child node of the shared node. An advantage of such a computer program product is that reduces the overall number of computations needed to simulate the serialized path.

DETAILED DESCRIPTION

Figure 1:
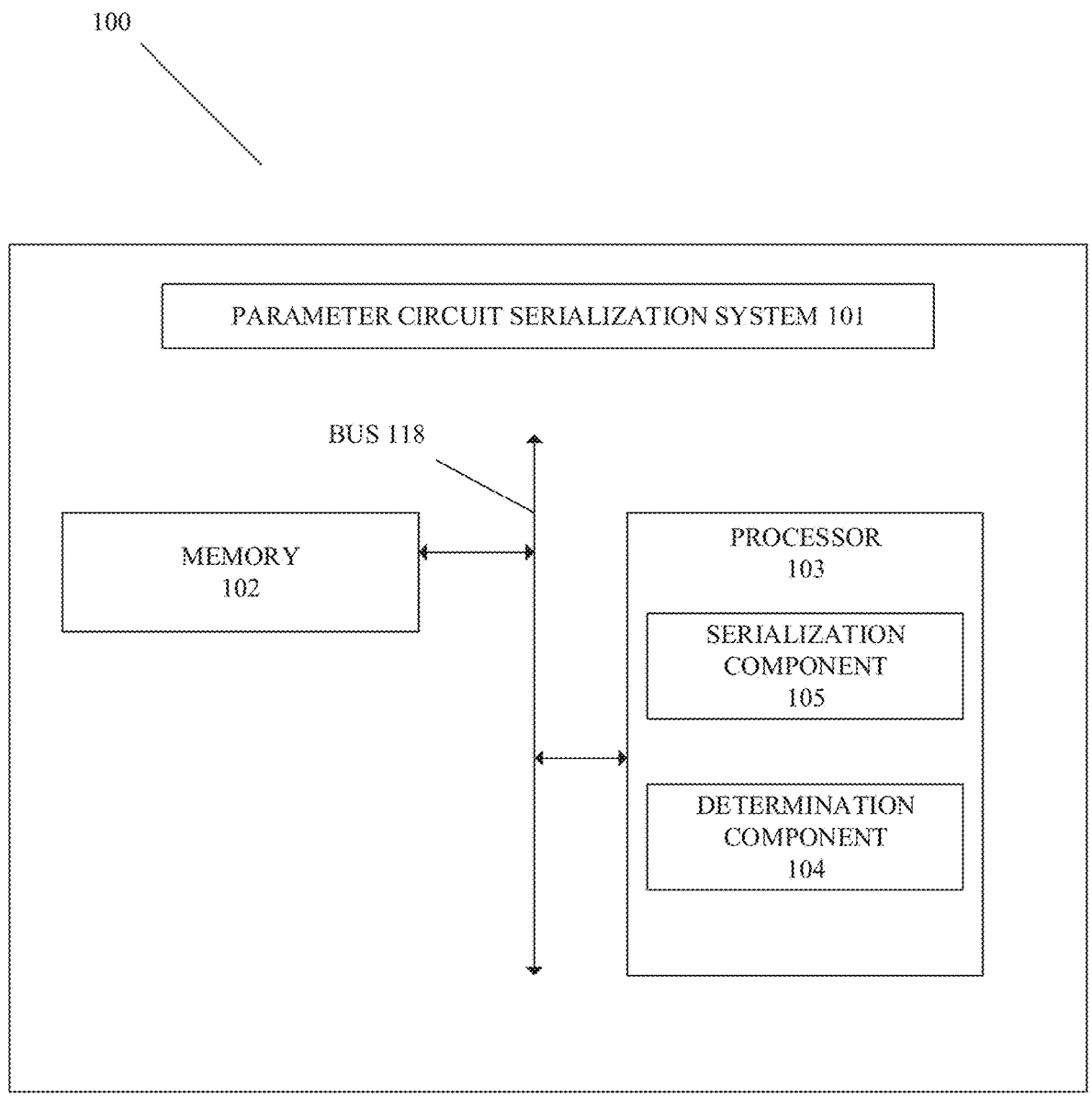
FIG. 1 illustrates a block diagram of example, non-limiting systems that can facilitate elimination and/or reduction of duplicate computations in parameterized circuit simulations in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

However, a problem with existing parameterized circuit technology is that most types of simulations, such as Variational Quantum Eigensolver applications (VQE) or the Qiskit architecture, use many parameter sets to be simulated in order to find an ideal or preferred parameter set. These existing approaches simulate each parameter set individually. Due to the large number of parameter sets used, many sets share high levels of similarity with one and other. In other words, many parameter sets share many of the same parameters in the same order. This leads to a high number of duplicate computations during the simulation of parameter sets which in turn greatly increases resource use and simulation time.

Given the problems described above with existing parameterized circuit simulation, the present disclosure can be implemented to produce a solution to these problems in the form of systems, computer-implemented methods, and/or computer program products that can facilitate serialization of parameter circuits by: determining a first path of computational nodes and a second path of computational nodes of a parameter tree comprising a plurality of computational nodes, wherein the first path of computational nodes and the second path of computational nodes share one or more computational nodes at the beginning of the first path of computational nodes and the second path of computational nodes; and/or creating a serialized path of computational nodes from the first path of computational nodes and the second path of computational nodes. An advantage of such systems, computer-implemented methods, and/or computer program products is that they can be implemented in order to reduce and/or eliminate duplicate parameter computations. For example, by creating a serialized path, duplicate computations can be identified in order to facilitate elimination and/or reduction of the number of duplicate computations performed.

In some embodiments, the present disclosure can be implemented to produce a solution to the problems described above in the form of systems, computer-implemented methods, and/or computer program products that can facilitate serialization of parameter circuits by: determining a first path of computational nodes and a second path of computational nodes of a parameter tree comprising a plurality of computational nodes, wherein the first path of computational nodes and the second path of computational nodes share one or more computational nodes at the beginning of the first path of computational nodes and the second path of computational nodes; creating a serialized path of computational nodes from the first path of computational nodes and the second path of computational nodes; and/or performing computations on the serialized path of computational nodes.

As referenced herein, an "edge" is a connection leading from a parent computational node to a child computational node. As referenced herein, a "root" or "start node" is a starting node of a parameter tree. As referenced herein a "leaf" or "endpoint" is a computational node in a parameter tree which has no child nodes.

Figure 2:
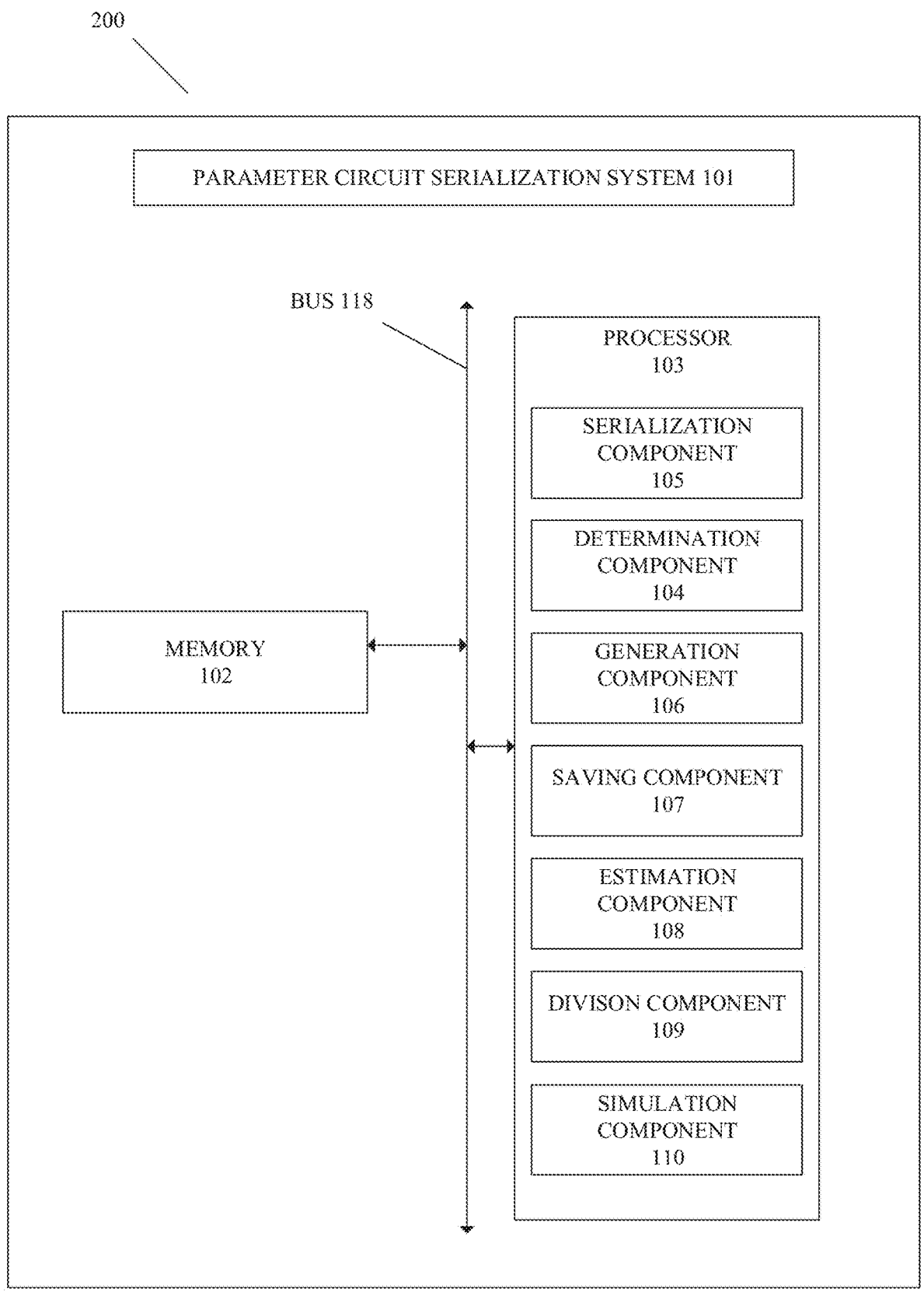
FIG. 2 illustrates a block diagram of example, non-limiting systems that can facilitate elimination and/or reduction of duplicate computations in parameterized circuit simulations in accordance with one or more embodiments described herein.

FIGS. 1 and 2 illustrate block diagrams of example non-limiting systems 100 and 200, respectively, that can each facilitate serialization of parameter circuits in accordance with one or more embodiments described herein. System 100 and system 200 can each comprise a parameter circuit serialization system 101. Parameter circuit serialization system 101 of system 100 depicted in FIG. 1 can comprise a memory 102, a processor 103, a determination component 104, a serialization component 105, and/or a bus 118. Parameter circuit serialization system 101 of system 200 depicted in FIG. 2 can further comprise a generation component 106, a saving component 107, an estimation component 108, a division component 109, and/or a simulation component 110.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100, system 200, and/or parameter circuit serialization system 101 can further comprise various computer and/or computer-based elements described herein with reference to operating environment 1200 and FIG. 12. In several embodiments, such computer and/or computing-based elements can be used in connection with implementing one or more of the systems, devices, components, and/or computer-implemented operations shown and described in connection with FIG. 1, FIG. 2, and/or other figures disclosed herein.

Memory 102 can store one or more computer and/or machine readable, writable, and/or executable components and/or instructions that, when executed by processor 103 (e.g., a classical processor, a quantum processor, and/or another type of processor), can facilitate performance of operations defined by the executable component(s) and/or instruction(s). For example, memory 102 can store computer and/or machine readable, writable, and/or executable components and/or instructions that, when executed by processor 103, can facilitate execution of the various functions described herein relating to parameter circuit serialization system 101, determination component 104, serialization component 105, generation component 106, saving component 107, estimation component 108, division component 109, simulation component 110, and/or another component associated with parameter circuit serialization system 101 as described herein with or without reference to the various figures of the subject disclosure.

Memory 102 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 102 are described below with reference to system memory 1216 and FIG. 12. Such examples of memory 102 can be employed to implement any embodiments of the subject disclosure.

Processor 103 can comprise one or more types of processors and/or electronic circuitry (e.g., a classical processor, a quantum processor, and/or another type of processor and/or electronic circuitry) that can implement one or more computer and/or machine readable, writable, and/or executable components and/or instructions that can be stored on memory 102. For example, processor 103 can perform various operations that can be specified by such computer and/or machine readable, writable, and/or executable components and/or instructions including, but not limited to, logic, control, input/output (I/O), arithmetic, and/or the like. In some embodiments, processor 103 can comprise one or more central processing unit, multi-core processor, microprocessor, dual microprocessors, microcontroller, System on a Chip (SOC), array processor, vector processor, quantum processor, and/or another type of processor. Further examples of processor 103 are described below with reference to processing unit 1214 and FIG. 12. Such examples of processor 103 can be employed to implement any embodiments of the subject disclosure.

Parameter circuit serialization system 101, determination component 104, serialization component 105, generation component 106, saving component 107, estimation component 108, division component 109, simulation component 110, and/or another component of parameter circuit serialization system 101 as described herein can be communicatively, electrically, operatively, and/or optically coupled to one another via bus 118 to perform functions of system 100, system 200, parameter circuit serialization system 101, and/or components coupled therewith. Bus 118 can comprise one or more memory bus, memory controller, peripheral bus, external bus, local bus, a quantum bus, and/or another type of bus that can employ various bus architectures. Further examples of bus 118 are described below with reference to system bus 1218 and FIG. 12. Such examples of bus 118 can be employed to implement any embodiments of the subject disclosure.

Parameter circuit serialization system 101 can comprise any type of component, machine, device, facility, apparatus, and/or instrument that comprises a processor and/or can be capable of effective and/or operative communication with a wired and/or wireless network. All such embodiments are envisioned. For example, parameter circuit serialization system 101 can comprise a server device, a computing device, a general-purpose computer, a special-purpose computer, a quantum computing device (e.g., a quantum computer), a tablet computer, a notebook computer, a desktop computer, a cell phone, a smart phone, a consumer appliance and/or instrumentation, an industrial and/or commercial device, a digital assistant, a multimedia Internet enabled phone, a multimedia player, and/or another type of device.

Parameter circuit serialization system 101 can be coupled (e.g., communicatively, electrically, operatively, optically, and/or coupled via another type or coupling) to one or more external systems, sources, and/or devices (e.g., classical and or/quantum computing devices, communication devices, and/or another type of external system, source, and/or device) using a wire and/or cable. For example parameter circuit serialization system 101 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, parameter circuit serialization system 101 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet) or a local area network (LAN). Parameter circuit serialization system 101 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, parameter circuit serialization system 101 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between parameter circuit serialization system 101 and external systems, sources, and/or devices (e.g., computing devices, communication devices, and/or another type of external system, source, and/or device).

Parameter circuit serialization system 101 can comprise one or more computer and/or machine readable, writable, and/or executable components and/or instructions that, when executed by processor 103 (e.g., a classical processor, a quantum processor, and/or another type of processor), can facilitate performance of operations defined by such component(s) and/or instruction(s). Further, in numerous embodiments, any component associated with parameter circuit serialization system 101, as described herein with or without reference to the various figures of the subject disclosure, can comprise one or more computer and/or machine readable, writable, and/or executable components and/or instructions that, when executed by processor 103, can facilitate performance of operations defined by such component(s) and/or instruction(s). For example, determination component 104, serialization component 105, generation component 106, saving component 107, estimation component 108, division component 109, simulation component 110, and/or any other components associated with parameter circuit serialization system 101 as disclosed herein (e.g., communicatively, electronically, operatively, and/or optically coupled with and/or employed by parameter circuit serialization system 101), can comprise such computer and/or machine readable, writable, and/or executable component(s) and/or instructions(s). Consequently, according to numerous embodiments, parameter circuit serialization system 101 and/or any components associated therewith as disclosed herein, can employ processor 103 to execute such computer and/or machine readable, writable, and/or executable component(s) and/or instruction(s) to facilitate performance of one or more operations described herein with reference to parameter circuit serialization system 101 and/or any such components associated therewith.

Parameter circuit serialization system 101 can facilitate (e.g., via processor 103): performance of operations executed by and/or associated with determination component 104, serialization component 105, generation component 106, saving component 107, estimation component 108, division component 109, simulation component 110, and/or another component associated with parameter circuit serialization system 101 as disclosed herein. For example, as described in detail below, parameter circuit serialization system 101 can facilitate (e.g., via processor 103): determining a first path of computational nodes and a second path of computational nodes of a parameter tree comprising a plurality of computational nodes, wherein the first path of computational nodes and the second path of computational nodes share one or more computational nodes at the beginning of the first path of computational nodes and the second path of computational nodes; and/or creating a serialized path of computational nodes from the first path of computational nodes and the second path of computational nodes. In another example, as described further in detail below, the parameter tree can represent a plurality of computational paths of the plurality of computational nodes in one or more quantum circuits.

In another example, as described in detail below, parameter circuit serialization system 101 can facilitate (e.g., via processor 103): generating the parameter tree comprising a plurality of computational nodes. In another example, as described in detail below, parameter circuit serialization system 101 can further facilitate (e.g., via processor 103): creating a serialized path of computational nodes from the first path of computational nodes and the second path of computational nodes, wherein the serialized path of computational nodes is created by adding one or more backwards edges from an endpoint of the first path of computational nodes to a shared node of the first path of computational nodes and the second path of computational nodes.

In another example, as described in detail below, parameter circuit serialization system 101 can facilitate (e.g., via processor 103): estimation of resource consumption to reach a depth of the parameter tree; and/or division of the parameter tree into one or more sub parameter trees.

In another example, as described in detail below, parameter circuit serialization system 101 can facilitate (e.g., via processor 103): creating a recovery node representing a shared node between the first path of computational nodes and the second path of computational nodes.

In another example, as described in detail below, parameter circuit serialization system 101 can facilitate (e.g., via processor 103): saving a state of the shared node of the first path of computational nodes and the second path of computational nodes to the recovery node. In another example, as described in detail below, parameter circuit serialization system 101 can facilitate (e.g., via processor 103): creating a serialized path of computational nodes from the first path of computational nodes and the second path of computational nodes, wherein the serialized path of computational nodes is created by connecting an endpoint of the first path of computational nodes to the recovery node, wherein the recovery node is connected to the second path of computational nodes at a child node of the shared node. In another example, as described in detail below, parameter circuit serialization system 101 can facilitate (e.g., via processor 103): performing computations on the serialized path of computational nodes.

Determination component 104 can determine a first path of computational nodes and a second path of computational nodes of a parameter tree comprising a plurality of computational nodes, wherein the first path of computational nodes and the second path of computational nodes share one or more computational nodes at the beginning of the first path of computational nodes and the second path of computational nodes. As referenced herein, a computational path can comprise a series of ordered data points. These data points may at least represent a series of computational nodes within in a quantum circuit simulation or a series of parameters to be implemented by the quantum circuit as part of a simulation.

In the examples above, determination component 104 can determine the first path of computational nodes by selecting a path from the root to a leaf or endpoint of the parameter tree. Determination component 104 can then select a branch off the first path. A branch off the first path of computational nodes occurs when a node within the first path of computational nodes has multiple child nodes. One of the child nodes will also be a part of the first path of computational nodes, but the others will not be within the first path of computational nodes. Determination component 104 can determine the second path of computational nodes by selecting one of the child nodes not in the first path of computational nodes and identifying a path from the root to the chosen child node and then to an endpoint unique from the endpoint of the first path of computational nodes.

In another embodiment, the parameter tree can be an ordered parameter tree. In an ordered tree, all nodes of the tree are assigned a value and the tree is organized based on the values assigned. Determination component 104 can determine the first path of computational nodes by starting at the root of the parameter tree and selecting a path from the root to the lowest ordered leaf or endpoint. For example, determination component 104 can select the child node of the root with the lowest value, and then select the child node of the child node with the lowest value. Determination component 108 can continue this process until determination component 108 has reached an endpoint. Determination component 104 can determine the second path of computational nodes by selecting a path from the root of the parameter tree to a branch off the first path of computational nodes to the next lowest ordered end point or leaf.

It should be appreciated that by determining the above described first path of computational nodes and second path of computational nodes of the parameter tree, the determination component 104 can identify common parameters between the first path of computational nodes and the second path of computational nodes, in order to facilitate avoidance of duplicated simulation of common parameters. For example, by determining a first path of computational nodes and a second path of computational nodes, wherein the first path of computational nodes and the second path of computational nodes share one or more computational nodes at the beginning of each computation path, duplicate computation nodes are identified. In this example, all computational nodes from the root of the parameter tree down to the branch point between the first path of computational nodes and the second path of computational nodes are common between the first path of computational nodes and the second path of computational nodes. These common computational nodes are duplicates and only need to be simulated once instead of multiple times for each path. By identifying this duplication, overall simulation time can be reduced by reducing the overall number of computations used to complete the simulation.

Serialization component 105 can create a serialized path of computation nodes from the first path of computational nodes and the second path of computational nodes by appending the second path of computational nodes to the endpoint or leaf of the first path of computational nodes. For example, serialization component 105 can identify a shared node between the first path of computational nodes and the second path of computational nodes where the shared node has a first child node which is part of the first path of computational nodes, but not the second path of computational nodes, and a second child node which is part of the second path of computational nodes, but not part of the first path of computational nodes. Serialization component 105 can then create the serialized path of computational nodes by attaching one or more backwards edges from the endpoint or leaf of the first path of computational nodes up each node in the first path until reaching the shared node between the first path of computational nodes and the second path of computational nodes. As defined herein, a backwards edge is an edge that denotes travel up a tree, from child to parent, as opposed to a traditional edge which denotes travel down the tree from parent to child. In an embodiment, backwards edges can be denoted as such through the use of a backwards edge flag. Serialization component 105 can disconnect the second child node which is a part of the second path of computational nodes from the shared computational node and connect the second child to the endpoint or leaf of the first path of computational nodes, via the one or more backwards edges.

This results in a serialized path which can be traversed from the root of the parameter tree, down the first path of computational nodes to the endpoint or leaf of the first path of computational nodes, then along the one or more backwards edges from the endpoint of the first path of computational nodes to the second child node which is a part of the second path of computational nodes, and then from the second child node to the endpoint or leaf of the second path of computational nodes. It should be noted that the serialized path created by serialization component 105 can be used by determination component 104 as a new first path of computational nodes. Determination component 104 can determine a new second path of computational nodes in accordance with the examples discussed above, and serialization component 105 can create a new serialized path of computational nodes from the new first path of computational nodes and the new second path of computational nodes. It should be noted that this process can be repeated until the entire parameter tree is represented in a single serialized path of computational nodes.

In another embodiment, serialization component 105 can identify a shared node between the first path of computational nodes and the second path of computational nodes where the shared node has a first child node which is part of the first path of computational nodes but not part of the second path of computational nodes, and a second child node which is part of the second path of computational nodes but not part of the first path of computational nodes. Serialization component 105 can then add a copy on write flag to the first child node and create a recovery node associated with the copy on write flag. In another embodiment, serialization component 105 can add a copy on write flag to all lowest ordered branches in a parameter tree at once. For example, at every branch in the parameter tree, serialization component 105 can add a copy on write flag to the node at the branch with the lowest order value. As another example, if a branch in the parameter tree comprises the nodes 'B' and 'b', wherein the value of B is less than b, then node B is the node at the branch with the lowest order value and serialization component 105 can add a copy on write flag to node B. In another embodiment, serialization component 105 can add copy on write flags after the parameter tree is divided into sub parameter trees. As described below in detail, division component 109 can divide the parameter tree into two or more sub parameter trees. For example, after division component 109 divides the parameter tree into two or more sub parameter trees, serialization component 105 can add a copy on write flag to the node at each branch with the lowest order value for each sub parameter tree. Serialization component 105 can detach the second path of computational nodes starting at the second child from the shared node and attach it to the recovery node. Serialization component 105 can then create an edge from the endpoint of leaf of the first path of computational nodes leading to the recovery node. This results in a serialized path which can be traversed from the root of the parameter tree, down the first path of computational nodes to the endpoint or leaf of the first path of computational nodes, then to the recovery node along the edge between the endpoint of the first path of computational nodes and the recovery node, and then from the recovery node to the endpoint or leaf of the second path of computational nodes. It should be noted that determination component 104 can use the serialized path of computational nodes created by serialization component 105 as a new first path of computational nodes. Determination component 104 can determine a new second path of computational nodes in accordance with the examples discussed above, and serialization component 105 can create a new serialized path of computational nodes from the new first path of computational nodes and the new second path of computational nodes. This process can be repeated until the entire parameter tree is represented in a single serialized path of computational nodes. In an embodiment, serialization component 105 can attach an endpoint flag to the leaves or endpoints of the first path of computation nodes and second path of computation nodes to denote them as leaf nodes.

It should be appreciated that by creating a serialized path of computational nodes from the first path of computational nodes and the second path of computational nodes, serialization component 105 can improve parameter circuit simulation time by eliminating duplicate computations between the first path of computational nodes and the second path of computational nodes. For example, creating a serialized path of computational nodes from the first path of computational nodes and the second path of computational nodes, all shared computations between the first path of computational nodes and the second path of computational nodes only need to be performed once, rather than multiple times. This reduces the overall number of computations needed to complete a simulation, which can reduce both simulation time and/or use of resources.

Simulation component 110 can simulate parameterized circuits by performing computations on nodes within the serialized path. As the parameter tree represents a plurality of computational paths of the plurality of computational nodes in a quantum circuit, once a computation is performed on a computational node in the serialized path, that node represents the state of a quantum circuit simulated by the parameters in the serialized path of computational nodes to that node. In an embodiment, simulation component 110 can perform two types of computations, forwards computations and reverse or inverse computations. A forward computation is one in which the simulation component performs a computation on a computational node and then moves down the serialized path to a child node via an edge between the computational node and the child node. A reverse or inverse computation involves the simulation component moving from a child node to a parent node via a backwards edge and restoring the parent node to its state prior to having a forward computation performed on the parent. In an embodiment, simulation component 110 can perform forward computations on the serialized path of computational nodes by staring at the root of the serialized path of computational nodes and performing computations moving down the serialized path. When simulation component 110 encounters a computational node that was an endpoint or leaf in a path used to create the serialized path of computational nodes, the simulation component can output or save the state of that node. This represents the completion of the simulation of one of the parameter sets contained within the parameter tree. If the node does not contain a backwards edge, then simulation component 110 has reached the end of the serialized path of computational nodes and the simulation is complete. If the node contains a backwards edge, simulation component 110 can move back up the serialized path to a parent of the node and performs a reverse computation. Simulation component 110 continues performing reverse computations until reaching a computational node which does not have a backwards edge. Simulation component 110 then resumes performing forward computations until reaching a computational node, which was an endpoint in a path of computations nodes that does not contain a backwards edge leading to another computational node. At this point, the simulation is then complete. In an embodiment, simulation component 110 can identify a computational node as a leaf or endpoint in a path used to create the serialized path of computational nodes by checking if the computational node has an endpoint flag.

It should be appreciated that by simulating the serialized path of computational nodes, simulation component 110 can decrease the time to simulate all the quantum circuits represented by a parameter tree. For example, by performing reverse computations on computational nodes containing backwards edges leading away from an endpoint or leaf, simulation component 110 can simulate a second set parameter without needing to begin computations over again from the root of the parameter tree. This leads to an overall decrease in computations, which leads to an improvement in simulation time.

In another embodiment, simulation component 110 only performs forward computations. In this example, simulation component 110 can begin forward computations at the root of the serialized path and continue computations along the path until reaching a computational node with a copy on write flag. Upon reaching the computational node with the copy on write flag, saving component 107 can save a state of a parent node of the computational node with the copy on right flag to a recovery node associated with the copy on write flag. This parent node is a shared computational node between the first path of computational nodes and the second path of computational nodes. Simulation component 110 can then resume performing forward computations on the serialized path of computational nodes. When simulation component 110 encounters a computational node that was an endpoint or leaf in a path used to create the serialized path of computational nodes, the simulation component 110 can output or save the state of that endpoint computational node. If the endpoint computational node does not have an edge leading to a recovery node, then the simulation is complete. If the endpoint node does have an edge leading to a recovery node, then simulation component 110 can follow the edge and begin performing forward computations from the recovery node using the state saved in the recovery node. In an embodiment, simulation component 110 can identify a computational node as a leaf or endpoint in a path used to create the serialized path of computational nodes by checking if the computational node has an endpoint flag.

It should be appreciated that by simulating the serialized path of computational nodes, simulation component 110 can decrease the time to simulate all the quantum circuits represented by a parameter tree. For example, by saving the state of a shared node to a recovery node, simulation component 110 can simulate the second path of computational nodes used to create the serialized path of computational nodes by taking advantage of computations performed when simulating the first path of computational nodes used to create the serialized path of computational nodes. This leads to an overall decrease in computations, which leads to an improvement in simulation time.

Generation component 106 can generate a parameter tree comprising a plurality of computational nodes. In an embodiment, the generation component 106 can receive one or more parameter sets, wherein each parameter set represents a plurality of computational nodes in a quantum circuit to be simulated. The generation component 106 can create a root node. The generation component 106 can then work through each parameter set in order at each level of the parameter tree. For example, if a parameter set has a first parameter of "a", generation component 106 can check if the root has a child computational node "a" already. If the root does not have child node "a", generation component can create a computational node "a" and create an edge from the root to computational node "a". If the root has a child node "a", generation component 106 can then check if child node "a" has a child representing the second parameter in the parameter set. This process can be continued until there is a path within the parameter tree representing each parameter set used to generate the tree. For example, if five parameter sets are used to generate a parameter tree, the parameter tree will have one root with five paths leading to five different endpoints or leaves. In an embodiment, the parameter tree can be an ordered tree to assist the parameter circuit serialization system 101 and/or any of the other components discussed herein.

Estimation component 108 can label each depth of the parameter tree with an estimated resource consumption (e.g., computations, memory space, memory operations, processor threads, simulation time etc.) to reach that depth of the parameter tree. For example, if it is estimated that to reach the second depth of the parameter tree will take forty seconds, estimation component 108 can label the second depth of the parameter tree with an estimated simulation time of forty seconds. In another embodiment, estimation component 108 can label each depth of the parameter tree with estimates of multiple types of resource consumption. For example, estimation component 108 can label each depth of the parameter tree with an estimated number of computations and memory operations used to reach each depth of the parameter tree. In an embodiment, this estimation can be based on an estimation input to the estimation component 108. In another embodiment, this estimation can be based on resource consumption of previously completed simulations. It should be noted that in parameterized circuits, resource consumption generally is determined by the number of parameters within a parameter set, rather than by the individual parameters themselves. As such, in an embodiment, the estimation component 108 can label each computational node in each depth of the parameter tree with an identical resource consumption. In another embodiment, the estimation component 108 can label each computational node within a depth of the parameter tree with a different estimated resource consumption, if those computational nodes may take different estimated resource consumptions to reach.

Division component 109 can divide the parameter tree into one or more sub parameter trees. In an embodiment, division component 109 can divide the parameter tree into one or more parameter trees based on the estimated resource consumption of each depth of the parameter tree, labeled by the estimation component 108. For example, if the maximum depth of the parameter tree has an estimated simulation time (e.g., a type of resource consumption) label of eighty seconds, division component 109 can divide the parameter tree into one or more sub parameter trees based on the depth of the parameter tree with the estimation time of forty seconds, or half of the maximum simulation time. If there is no depth of the parameter tree with an estimated simulation time of exactly half of the maximum simulation time, a depth of the parameter tree can be selected based on an estimation time that is within a threshold of half of the maximum. In another embodiment, division component 109 can divide the parameter tree based on different criteria than half of the maximum estimated resource consumption. For example, division component 109 can divide the parameter tree based on one fourth, one third, three fourths, and/or any other fraction or percentage of the maximum estimated resource consumption. In another embodiment, division component 109 can divide the parameter tree based on a depth of the parameter tree where a branch occurs. For example, if there is a branch at the second depth of the parameter tree, the depth below the root of the parameter tree, division component 109 can divide the parameter tree into one or more sub parameter trees based on the number of nodes in the second depth of the parameter tree. In another embodiment, division component 109 can divide the parameter tree based on a criteria input by a user. In an embodiment, parameter circuit serialization system 101, including determination component 104, serialization component 105, saving component 107, estimation component 108, division component 109, simulation component 110, and/or any other component of parameter circuit serialization system 101, can use the one or more sub parameter trees in the same manner as a parameter tree.

It should be appreciated that by dividing the parameter tree into one or more sub parameter trees, division component 109 can decrease the overall simulation time. For example, by dividing the parameter tree into one or more sub parameter based on half the maximum estimated resource consumption, the division component 109 can identify instances when methods described above for eliminating duplicate computations add more resource consumption than they save through the elimination of duplicate computations. In this example, the division criteria of half of the maximum resource consumption acts a breakeven point that determines whether eliminating the duplicate computations results in a net decrease in resource consumption or not. As another example, by dividing the parameter tree into one or more sub parameter trees based on the number of nodes at depth one of the parameter tree, the division component can identify instances where there are few or no duplicate computations between computational paths in the parameter tree. In this example, by identifying the lack of duplicate computations, division component 109 can decrease simulation time and/or lower parameter circuit serialization system 101 resource consumption by preventing one or more parameter serialization methods described herein from being used.

Figure 3:
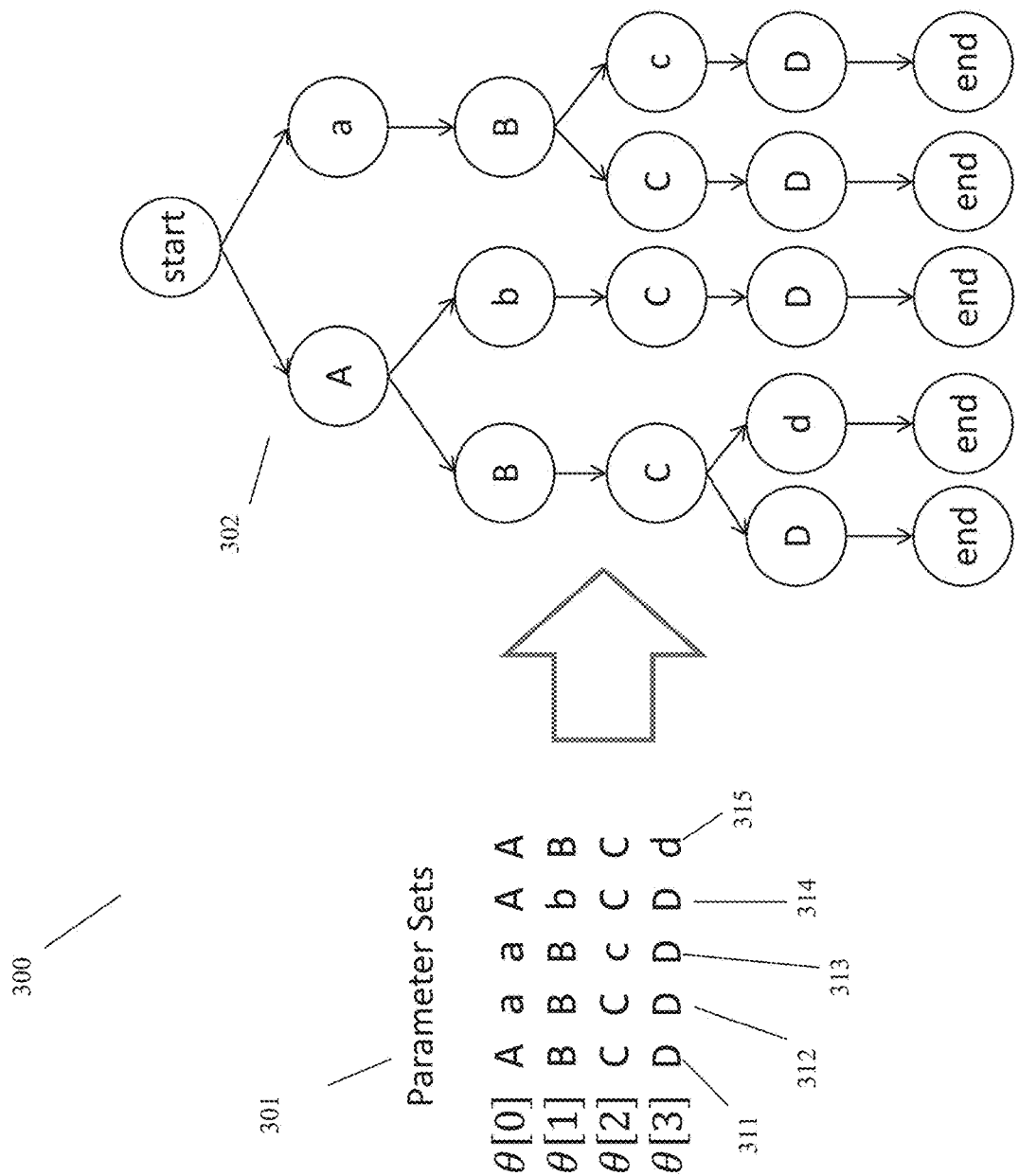
FIG. 3 illustrates an example, non-limiting diagram that can facilitate parameter tree generation from one or more parameter sets in accordance with one or more embodiments described herein.

FIG. 3 illustrates an example, non-limiting diagram 300 that can facilitate parameter tree generation from one or more parameter sets. Repetitive description of like elements and/or processes employed in respective embodiments is omitted for sake of brevity.

Diagram 300 composes a set of one or more parameter sets 301, which illustrate a visual representation of parameter sets for simulation. Parameter sets 311-315 are shown, in this example each having four parameters. In an embodiment, any number of parameters can be included in parameter sets 311-315. As described with reference to FIGS. 1 and 2, parameter sets 301 can be transformed into parameter tree 302 by generation component 106 as described in detail above. As illustrated, parameter tree 302 can comprise five endpoints, each representing one of parameter sets 311-315 used to generate parameter tree 302. In an embodiment, parameter tree 302 can be an ordered tree. In an example, if the letters within the nodes of the parameter tree are assigned values based on alphabetic order, with capital letters having a lower value than the same lowercase letter, then parameter tree 302 is an ordered tree. For example, 'A' would have a lower value than 'a', while 'a' would have a lower value than 'B'.

Figure 4:
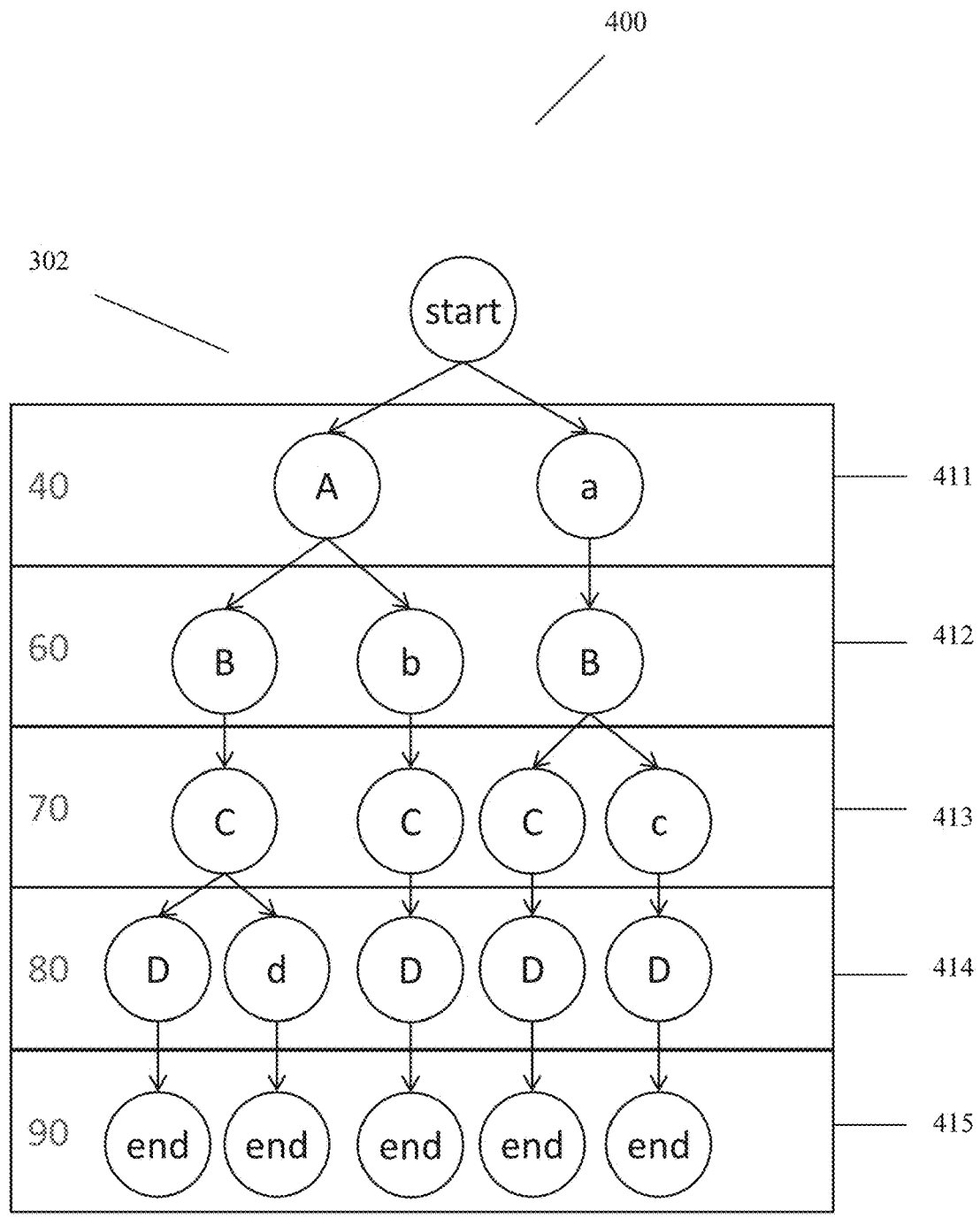
FIG. 4 illustrates an example, non-limiting diagram that can facilitate estimation of simulation time at each depth in the parameter tree in accordance with one or more embodiments described herein.

FIG. 4 illustrates an example non-limiting diagram 400 that can facilitate estimation of simulation time at each depth in the parameter tree. Repetitive description of like elements and/or processes employed in respective embodiments is omitted for sake of brevity.

Diagram 400 composes parameter tree 302 that illustrates how estimation component 108 can label estimated resource consumption, in this case estimated simulation time, at each depth of the parameter tree. As described above with reference to FIGS. 1 and 2, estimation component 108 can label each depth 411-415 of parameter tree 302 with an estimated simulation time. For example, depths 411-415 are labeled with the estimations of forty, sixty, seventy, eighty, and ninety seconds respectively. These estimated simulation times can be determined in accordance with the respective embodiments discussed above.

Figure 5:
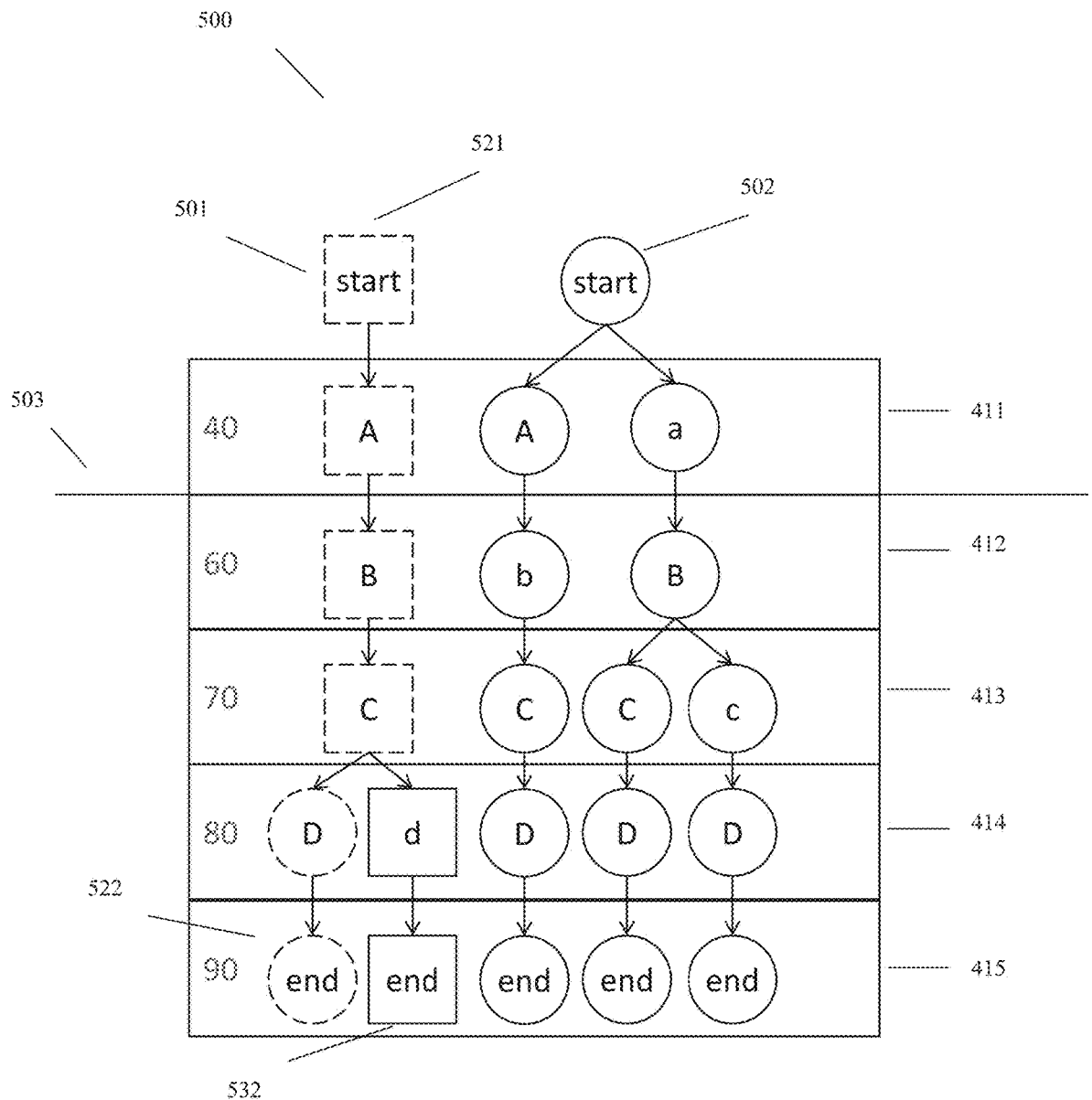
FIG. 5 illustrates an example, non-limiting diagram that can facilitate division of the parameter tree into one or more sub trees and the determination of a first path of computational nodes and a second path of computational nodes in accordance with one or more embodiments described herein.

FIG. 5 illustrates an example non-limiting diagram 500 that can facilitate division of the parameter tree into one or more sub trees and the determination of a first path of computational nodes and a second path of computational nodes. Diagram 500 composes sub parameter trees 501 and 502 to illustrate how division component 109 can divide parameter tree 302. As described above with reference to FIGS. 1 and 2, division component 109 can divide the parameter tree into one or more sub parameter trees. As described above, in an embodiment, division of the parameter tree into one or more sub parameter trees can be based off half the maximum estimated resource consumption, in this case estimated simulation time. For example, the maximum estimated simulation time is shown at depth 415 as ninety seconds. While no depth has an estimated simulation time of exactly forty-five seconds (half of the maximum estimated simulation time of ninety seconds), division component 109 can select depth 411, with an estimated simulation time of forty seconds, as a division point 503, based on being the depth closest to half the maximum estimated simulation time. Division component 109 can divide parameter tree 302 into sub parameter trees 501 and 502, based on division point 503.

As described above with reference to FIGS. 1 and 2, determination component 104 can determine a first path of computational nodes and a second path of computational nodes of a parameter tree comprising a plurality of computational nodes, wherein the first path of computational nodes and the second path of computational nodes share one or more computational nodes at the beginning of the first path of computational nodes and the second path of computational nodes. As described above, in an embodiment, determination component 104 can determine the first path of computational nodes (denoted by dashed lines) of sub parameter tree 501 by identifying a path from a root ("start" node) 521 of sub parameter tree 501 to a leaf ("end" node) 522 of sub parameter tree 501. Determination component 104 can determine the second path of computational nodes (denoted by squares) by identifying a path from the root to a path branching off the first path of computational nodes which leads to a different leaf ("end" node) 532 from the leaf 522 of the first path of computational nodes. It should be noted that the first path of computational nodes and the second path of computational nodes share computational nodes "start", "A", "B", and "C" (denoted by a square with a dashed line).

Figure 6:
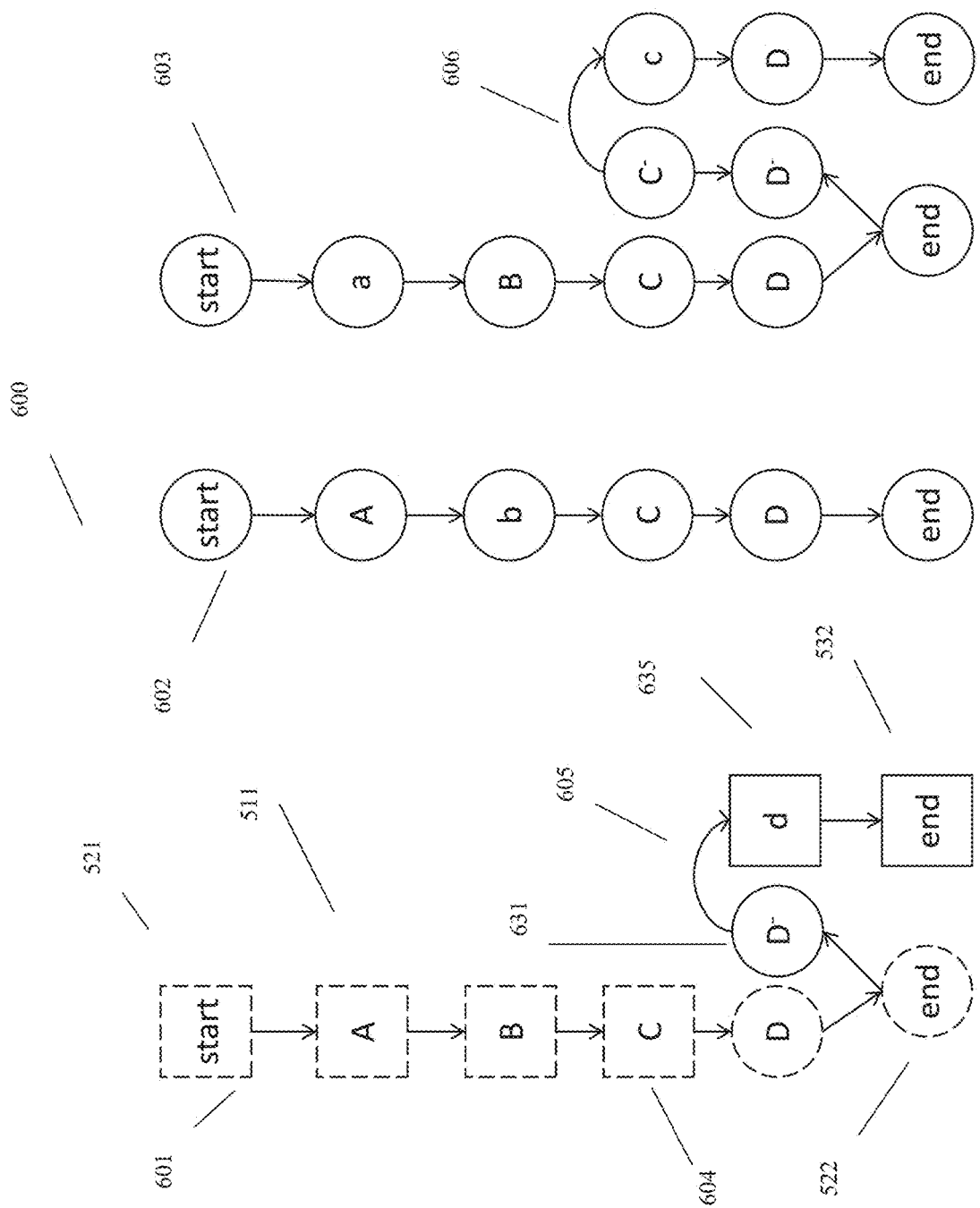
FIG. 6 illustrates an example, non-limiting diagram that can facilitate the creation of a serialized path of computational nodes from a first path of computational nodes and a second path of computational nodes in accordance with one or more embodiments described herein.

FIG. 6 illustrates an example non-limiting diagram 600 that illustrates creation of a serialized path of computational nodes from a first path of computational nodes and a second path of computational nodes. As described above, in an embodiment, serialization component 105 can create the serialized path of computational nodes 601 from the first path of computational nodes and the second path of computational nodes by creating a backwards edge 605 from the leaf 522 of the first path of computational nodes until reaching a shared computational node 604 which has child nodes in both the first path of computational nodes and the second path of computational nodes. Serialization component 105 can then disconnect the child node 635 which is part of the second path of computational nodes from the shared computational node 604 and connect the child node 635 to the leaf of the first path of computational nodes 422 via the backwards edge 605. It should be noted that a single serialized path of computational nodes 601 now exists from the root 521 to the leaf 522 of the first path of computational nodes, and then to the leaf 532 of the second path of computational nodes via the backwards edge 605. The serialized path of computational nodes 601 now contains all the paths of computational nodes from sub parameter tree 501.

Non-limiting diagram 600 also illustrates the simulation of the serialized path of computational nodes 601. As described above, in an embodiment, simulation component 110 can begin computations at root 521. Simulation component 110 can then perform forward computations down the serialized path of computational nodes 601 until reaching leaf ("end" node) 522. Simulation component 110 can save or output the state of leaf 522. As leaf 522 has a backwards edge leading away from it, simulation component 110 can perform reverse or inverse computation 631 to achieve the state at the shared computational node 604. Simulation component 110 can then continue forward computations beginning with node 635. Upon reaching leaf 532, simulation component 110 can output or save the state of leaf 532. As leaf 532 has no backwards edges leading away from it, simulation of the serialized path of computational nodes 601 is now complete. This corresponds to completing the simulation of parameter sets 311 and 315 respectfully.

As described above with reference to FIGS. 1 and 2, division component 109 can divide sub parameter trees into one more sub parameter trees in the same manner as dividing a parameter tree. For example, sub parameter tree 502 can be further divided into sub parameter trees 602 and 603. Determination component 104 can determine a first path of computational nodes and a second path of computational nodes for sub parameter trees 602 and 603 respectively. Serialization component 105 can create a serialized path for each of sub parameter trees 602 and 603 respectfully. It should be noted that some parameter trees or sub parameter trees, such as sub parameter tree 602, may only contain a first path of computational nodes and thus there is no serialization to complete. This can be determined by determination component 104 not identifying any branches off a first path of computational nodes. Simulation component 110 can perform computations on the serialized paths created from sub parameter trees 602 and 603. This corresponds to completing the simulation of parameter sets 312-314 respectfully.

Figure 7:
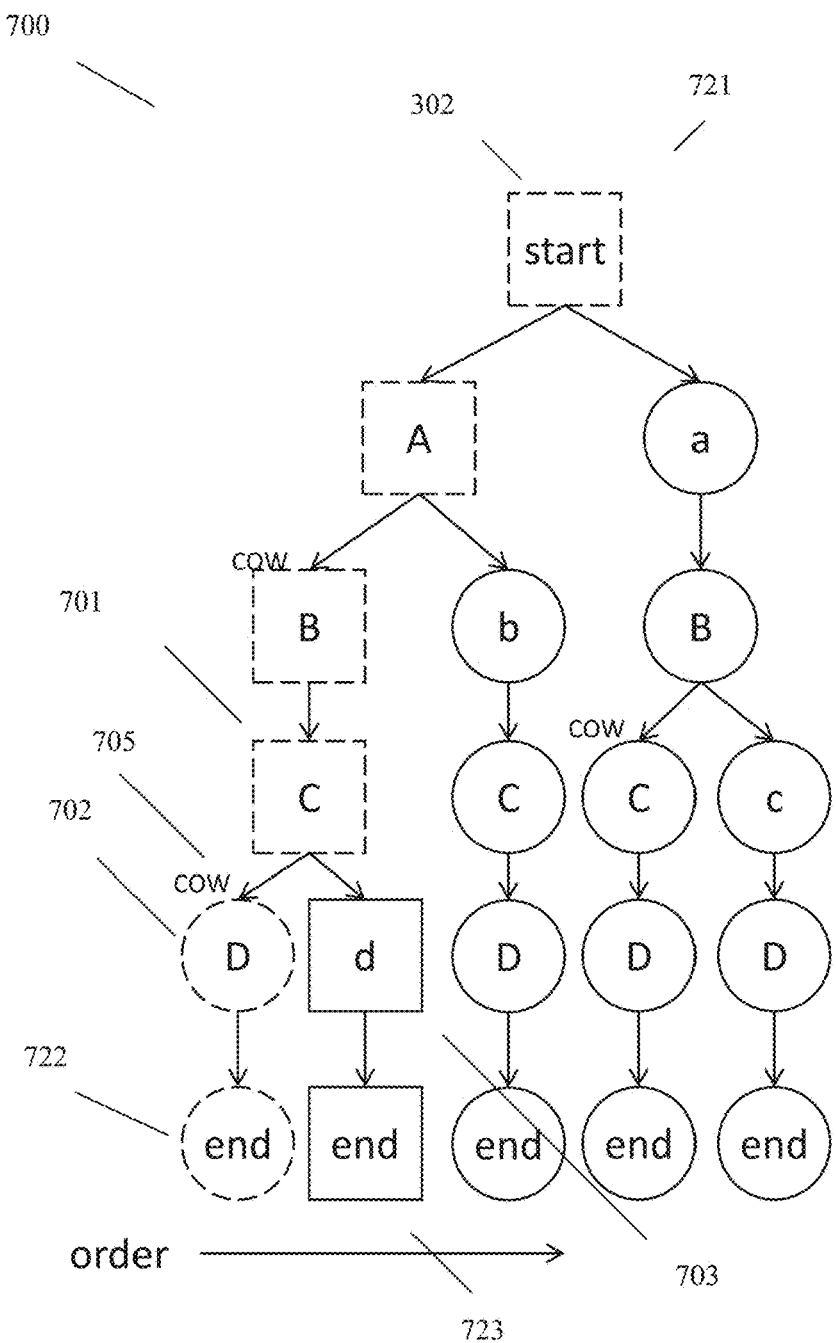
FIG. 7 illustrates an example, non-limiting diagram that can facilitate the determination of a first path of computational nodes and a second path of computational nodes in accordance with one or more embodiments described herein.

FIG. 7 illustrates an example, non-limiting diagram 700 that can facilitate determination of a first path of computational nodes and a second path of computational nodes. Repetitive description of like elements and/or processes employed in respective embodiments is omitted for sake of brevity.

Diagram 700 comprises parameter tree 302. As described above with reference to FIGS. 1 and 2, determination component 104 can determine the first path (denoted by dashed lines) by starting at a root ("start" node) 721, and then selecting a path to the lowest ordered leaf ("end" node) 722. Determination component 104 can determine the second path (denoted in squares) by identifying a path starting from a node shared with the first path of computational nodes, root 721, to a branch off the first path of computational nodes leading to the next lowest ordered leaf ("end" node) 732.

As described above with reference to FIGS. 1 and 2, serialization component 105 can create a serialized path of computational nodes from the first path of computational nodes and the second path of computational nodes. In an embodiment, serialization component 105 can identify a shared node 701 between the first path of computational nodes and the second path of computational nodes where the shared node 701 has a first child node 702 which is part of the first path of computational nodes and a second child node 703 which is part of the second path of computational nodes. Serialization component 105 can then add a copy on write flag 705 to the first child node 702. In another example, serialization component 105 can add a copy on write flag to all lowest ordered branches in a parameter tree before the determination of a first path of computational nodes and a second path of computational nodes, by determination component 104.

Figure 8:
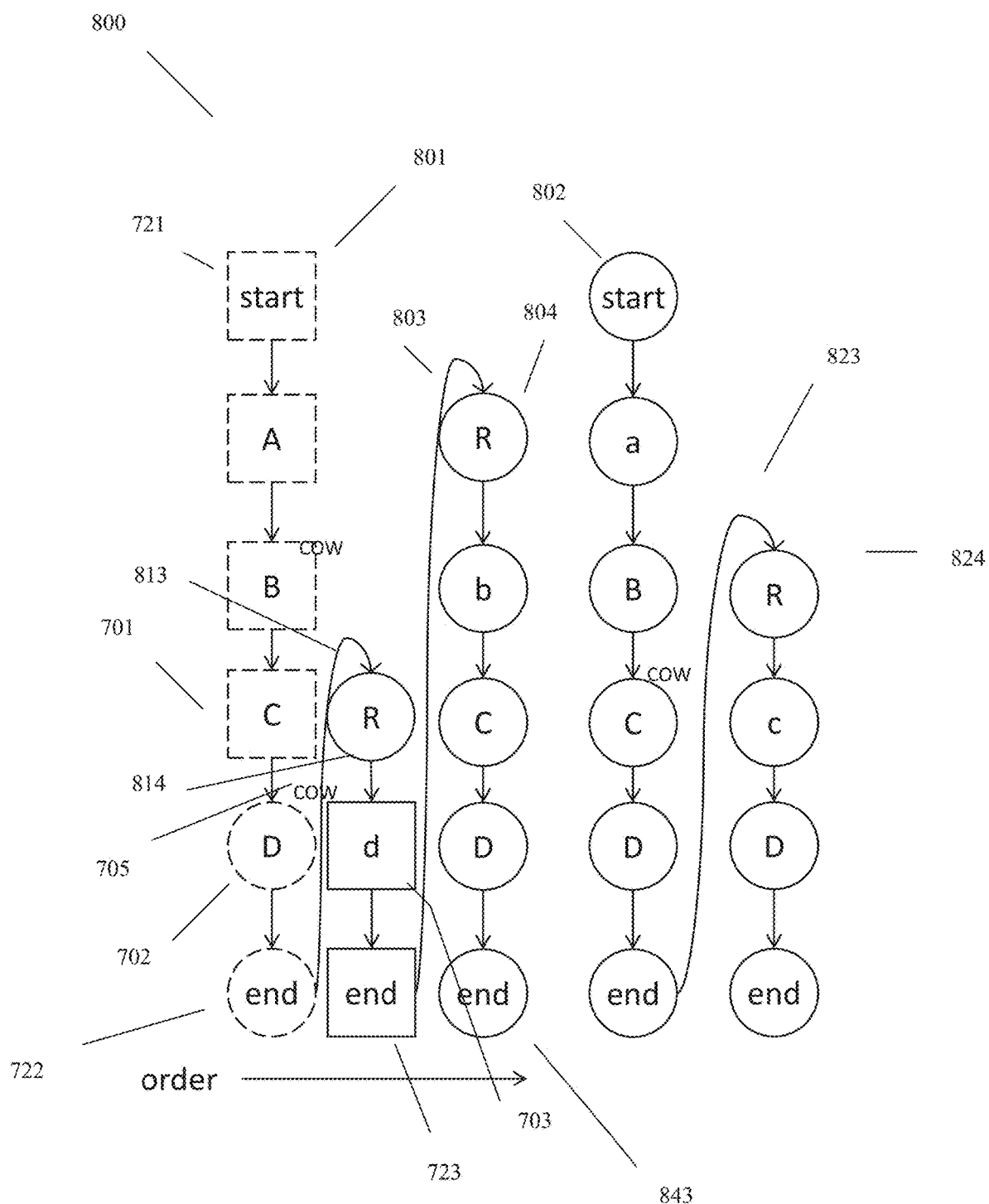
FIG. 8 illustrates an example, non-limiting diagram that can facilitate the creation of a serialized path of computational nodes from a first path of computational nodes and a second path of computational nodes in accordance with one or more embodiments described herein.

FIG. 8 illustrates an example, non-limiting diagram 800 that illustrates creation of a serialized path of computational nodes from a first path of computational nodes and a second path of computational nodes. Repetitive description of like elements and/or processes employed in respective embodiments is omitted for sake of brevity.

As described above with reference to FIGS. 1 and 2, serialization component 105 can create a serialized path of computational nodes from the first path of computational nodes and the second path of computational nodes. In an embodiment, when serialization component 105 adds the copy on write flag 705 to the first child node 702, serialization component 105 can create a recovery node 814 associated with the copy on write flag 705. Serialization component 105 can detach the second path of computational nodes starting at the second child node 703 from the shared node 701 and attach it to the recovery node 814. An edge can then be created leading from leaf ("end" node) 722 to recovery node 814. In this example, a serialized path is then created starting at root 721 leading to leaf 722, then continuing to recovery node 814 leading to leaf 723. This serialized path of computational nodes represents parameter sets 311 and 315. In another embodiment, serialization component 105 can detach the second path of computational nodes from the shared node 701 starting at the second child node 703 and attach it to the recovery node 814 without creating the edge from leaf 722 to recovery node 814. In this embodiment, the path starting at recovery node 814 is then considered a sub parameter tree.

As described above, in an embodiment, the serialized path can be further used by determination component 104 as a new first path of computational nodes. For example, the serialized path beginning at root 621 and ending at leaf 723 can be used by determination component 104 as the new first path of computational nodes. A new second path of computational nodes ending at leaf 843 can then be selected as described above. Serialization component 105 can then create a new serialized path of computational nodes from the new first path of computational nodes starting at root 721 and ending at leaf 723 and the new second path of computational nodes ending at leaf 843. This can be achieved through the creation and use of recovery node 804, similarly to the creation and use of recovery node 814 as described in detail above. This serialized path then represents parameter sets 311, 315, and 314. This process can be repeated until all leaves or endpoint of sub parameter tree 801 are included in a single serialized path.

As described above with reference to FIGS. 1 and 2, division component 109 can divide parameter trees into one or more sub parameter trees. For example, parameter tree 302 can be divided into sub parameter trees 801 and 802. Sub parameter tree 802 can then be serialized in the same manner as one of the examples described in detail above.

As described above, in an embodiment, simulation component 110 can begin computations at root 721. Simulation component 110 can continue computations down the serialized path until reaching first child node 702. Upon reaching first child node 702 with copy on write flag 705, Saving component 107 can save the state of parent node, which is shared node 701, of first child node 702 to recovery node 814. Simulation component 110 can then resume computations down the serialized path at first child node 702. Upon reaching leaf ("end" node) 722, simulation component 110 can save or output the state of leaf 722. This represents completion of simulation of parameter set 311. Simulation component 110 can then follow the edge from leaf 722 to recovery node 814 and can resume computations down the serialized path from recovery node 814. Upon reaching leaf 723, simulation component 110 can save or output the state of leaf 723. This represents completion of simulation of parameter set 315. Simulation component 110 can then follow the edge from leaf 723 to recovery node 804 and resume computations down the serialized path from recovery node 804. Upon reaching leaf 843, simulation component can save or output the state of leaf 843. This represents completion of simulation of parameter set 314. In an embodiment, simulation component 110 can then perform computations on any remaining serialized paths created from other sub parameter trees. For example, simulation component 110 can then perform computations on a serialized path of sub parameter tree 802. This represents completing the simulation of parameter sets 312 and 313.

Figure 9:
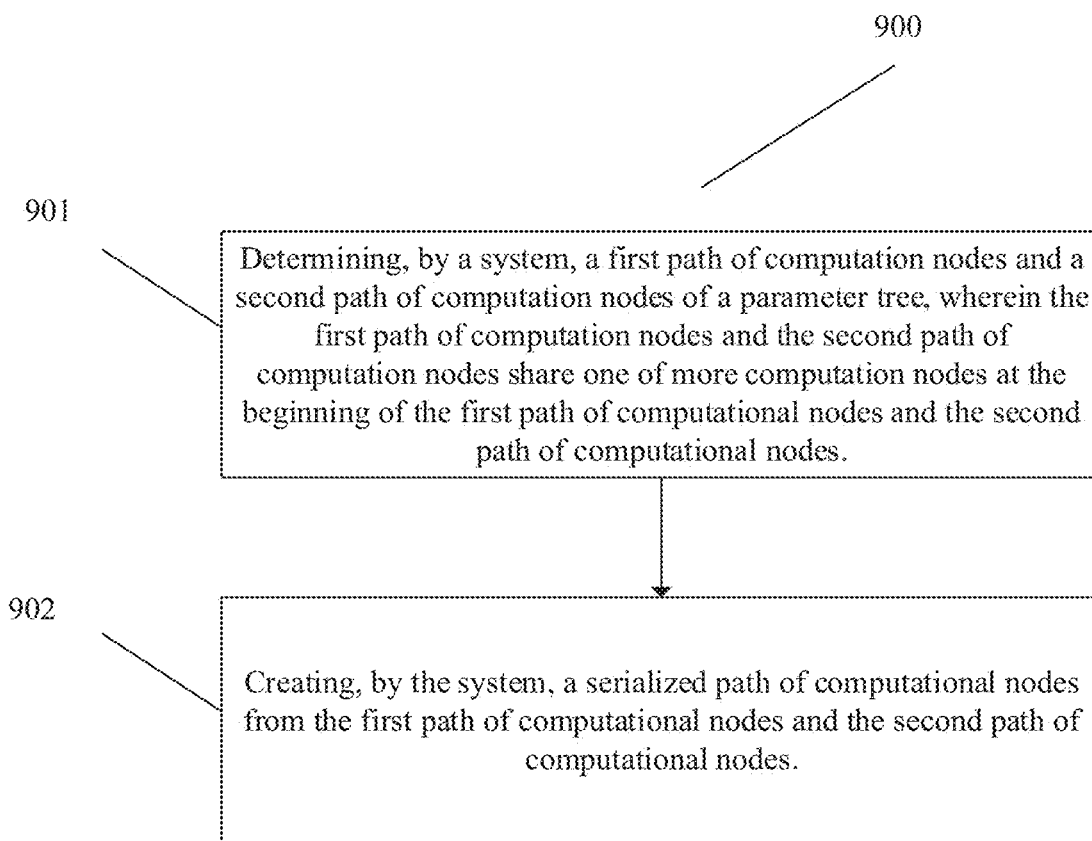
FIG. 9 illustrates a flow diagram of an example, non-limiting computer-implemented method that can facilitate elimination and/or reduction of duplicate computations in parameterized circuit simulations in accordance with one or more embodiments described herein.

FIG. 9 illustrates a flow diagram of an example, non-limiting computer-implemented method 900 that can facilitate elimination and/or reduction of duplicate computations in parameterized circuit simulations in accordance with one or more embodiments described herein. Repetitive description of like elements and/or processes employed in respective embodiments is omitted for sake of brevity.

At 901, computer implemented method 900 can comprise determining, by a system, a first path of computational nodes of a parameter tree (e.g., via determination component 104), wherein the first path of computational nodes and the second path of computational nodes share one or more computational nodes at the beginning of the first of computational nodes and the second path of computational nodes. For example, as described above with reference to FIGS. 1 and 2, determination component 104 can determine the first path of computational nodes of a parameter tree by identifying a path from a root ("start" node) of the parameter tree to a leaf ("end" node) of the parameter tree. Determination component 104 can determine the second path of computational nodes by identifying a path from the root to a path branching off the first path of computational nodes, which leads to a different leaf ("end" node) from the leaf of the first path of computational nodes.

At 902, computer implemented method 900 can comprise creating, by the system, a serialized path of computational nodes from the first path of computational nodes and the second path of computational nodes (e.g., via serialization component 105). For example, as described above in reference to FIGS. 1 and 2, serialization component 105 can create the serialized path from the first path of computational nodes and the second path of computational nodes by creating one or more backwards edges from the leaf of the first path of computational nodes up the first path of computational nodes to a shared computational node which has child nodes in both the first path of computational nodes and the second path of computational nodes. Serialization component 105 can then disconnect the child node which is part of the second path of computational nodes from the shared computational node and connect the child node to the leaf of the first path of computational nodes via the one or more backwards edges.

Figure 10:
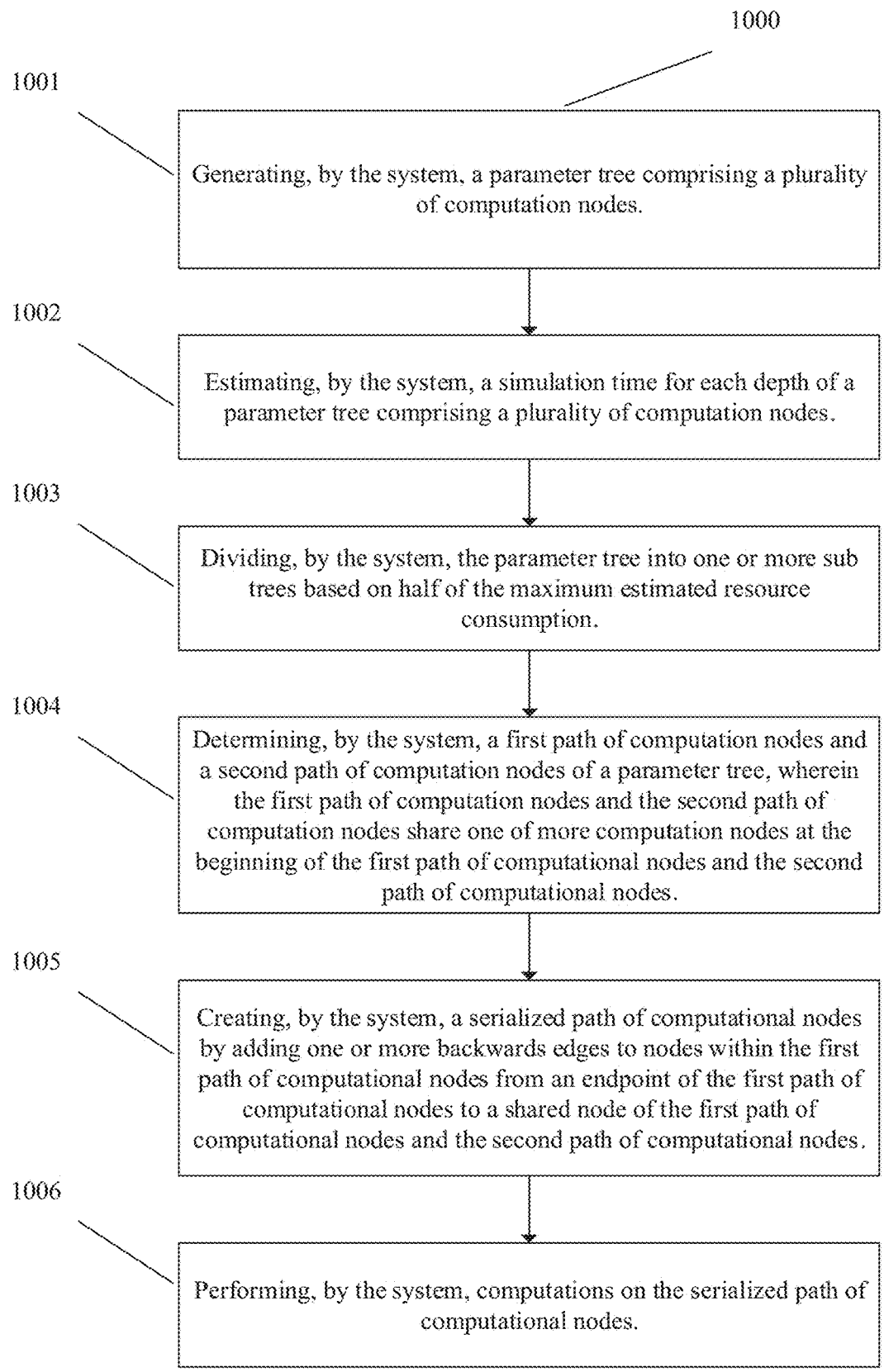
FIG. 10 illustrates a flow diagram of an example, non-limiting computer-implemented method that can facilitate elimination and/or reduction of duplicate computations in parameterized circuit simulations in accordance with one or more embodiments described herein.

FIG. 10 illustrates a flow diagram of an example, non-limiting computer-implemented method 1000 that can facilitate elimination and/or reduction of duplicate computations in parameterized circuit simulations in accordance with one or more embodiments described herein. Repetitive description of like elements and/or processes employed in respective embodiments is omitted for sake of brevity.

At 1001, computer implemented method 1000 can comprise generating, by a system, a parameter tree comprising a plurality of computational nodes (e.g., via generation component 106). For example, as described with reference to FIGS. 1 and 2, generation component 106 can generate a parameter tree with one root node and five leaves or endpoints from a parameter set comprising five sets of parameters to be simulated, each representing a different circuit to be simulated.

At 1002, computer implemented method 1000 can comprise estimating, by the system, an estimated resource consumption for each depth of the parameter tree comprising of plurality of computational nodes (e.g., via estimation component 108). For example, as described above with reference to FIGS. 1 and 2, estimation component 108 can label each depth of the parameter tree with an estimate of how long it would take to simulate a parameter circuit to that depth of the parameter tree.

At 1003, computer implemented method 1000 can comprise dividing, by the system, the parameter tree into one or more sub trees based on half of the maximum estimated resource consumption (e.g., via division component 109). For example, As described above with reference to FIGS. 1 and 2, division component 109 can divide the parameter tree into one or more sub parameter trees based on the depth of the parameter tree labeled as half the maximum estimated resource consumption.

At 1004, computer implemented method 1000 can comprise determining, by the system, a first path of computational nodes and a second path of computational nodes of each of the sub trees (e.g., via determination component 104), wherein the first path of computational nodes and the second path of computational nodes share one or more computational nodes at the beginning of the first path of computational nodes and the second path of computational nodes. For example, as described above with reference to FIGS. 1 and 2, determination component 104 can determine the first path of computational nodes of a parameter tree by identifying a path from a root ("start" node) of the parameter tree to a leaf ("end" node) of the parameter tree. Determination component 104 can determine the second path of computational nodes by identifying a path from the root to a path branching off the first path of computational nodes, which leads to a different leaf ("end" node) from the leaf of the first path of computational nodes.

At 1005, computer implemented method 1000 can comprise creating, by the system, a serialized path of computational nodes (e.g., via serialization component 105) by adding one or more backwards edges to nodes within the first path of computational nodes from the endpoint or leaf of the first path of computational nodes to a shared node within the first path of computational nodes and the second path of computational nodes. For example, as described above in reference to FIGS. 1 and 2, serialization component 105 can create the serialized path of computational nodes from the first path of computational nodes and the second path of computational nodes by creating one or more backwards edges from the leaf of the first path of computational nodes up the first path of computational nodes to a shared computational node which has child nodes in both the first path of computational nodes and the second path of computational nodes. Serialization component 105 can disconnect the child node which is part of the second path of computational nodes from the shared computational node and connect the child node to the leaf of the first path of computational nodes via the one or more backwards edges.

At 1006, computer implemented method 1000 can comprise performing, by the system, computations on the serialized path of computational nodes (e.g., via simulation component 110). For example, as described above in reference to FIGS. 1 and 2, simulation component 110 can perform forward computations down the serialized path until reaching a leaf node. Upon reaching the leaf node, simulation component can output or save the state of the leaf node. If the leaf node has a backwards edge leading away from it, simulation component 110 can perform reverse computations following backwards edges until reaching a computational node without a backwards edge. Upon reaching the computational node without the backwards edge, simulation component can perform forward computations beginning at the computational node without a backwards edge.

Figure 11:
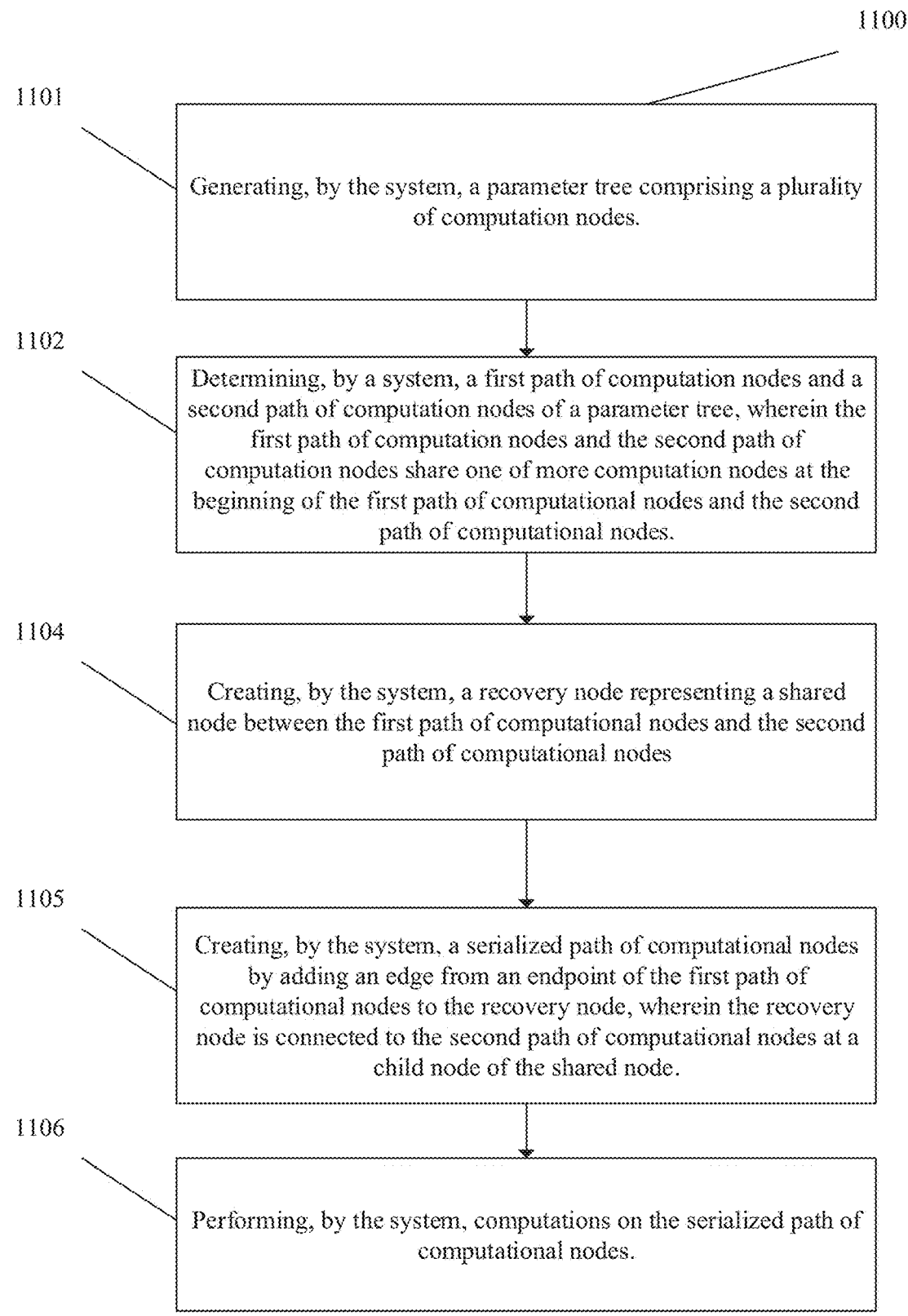
FIG. 11 illustrates a flow diagram of an example, non-limiting computer-implemented method that can facilitate elimination and/or reduction of duplicate computations in parameterized circuit simulations in accordance with one or more embodiments described herein.

FIG. 11 illustrates a flow diagram of an example, non-limiting computer-implemented method 1100 that can facilitate elimination and/or reduction of duplicate computations in parameterized circuit simulations in accordance with one or more embodiments described herein. Repetitive description of like elements and/or processes employed in respective embodiments is omitted for sake of brevity.

At 1101, computer implemented method 1100 can comprise generating, by a system, a parameter tree comprising a plurality of computational nodes (e.g., via generation component 106). For example, as described with reference to FIGS. 1 and 2, generation component 106 can generate a parameter tree with one root node and five leaves or endpoints from a parameter set comprising five sets of parameters to be simulated, each representing a different circuit to be simulated.

At 1102, computer implemented method 1100 can comprise determining, by the system, a first path of computational nodes and a second path of computational nodes of each of the sub trees (e.g., via determination component 104), wherein the first path of computational nodes and the second path of computational nodes share one or more computational nodes at the beginning of the first path of computational nodes and the second path of computational nodes. For example, as described above with reference to FIGS. 1 and 2, determination component 104 can determine the first path of computational nodes by starting at the root of the parameter tree, and then selecting a path to the lowest ordered leaf. Determination component 104 can determine the second path of computational nodes by identifying a path starting from a shared computational node with the first path of computational nodes, such as the root, to a branch off the first path of computational nodes leading to the next lowest ordered leaf.

At 1103, computer implemented method 1100 can comprise, creating, by the system, a recovery node representing a shared node between the first path of computational nodes and the second path of computational nodes (e.g., via serialization component 105). For example, as described above with reference to FIGS. 1 and 2, serialization component 105 can identify a shared node between the first path of computational nodes and the second path of computational nodes where the shared node has a first child node which is part of the first path of computational nodes and a second child node which is part of the second path of computational nodes. Serialization component 105 can add a copy on write flag to the first child node. Serialization component 105 can create a recovery node associated with the copy on write flag.

At 1104, computer implemented method 1100 can comprise creating, by the system, a serialized path of computational nodes by connecting an endpoint of the first path of computational nodes to the recovery node (e.g., via serialization component 105), wherein the recovery node is connected to the second path of computational nodes at a child node of the shared node. For example, as described in reference to FIGS. 1 and 2, serialization component 105 can detach the second path of computational nodes starting at the second child node of the shared node. Serialization component 105 can create an edge leading from the leaf of the first path of computational nodes to the recovery node.

At 1105, computer implemented method 1100 can comprise performing, by the system, computations on the serialized path of computational nodes (e.g., simulation component 110). For example, as described in reference to FIGS. 1 and 2, simulation component 110 can begin forward computations at the root of the serialized path of computational nodes. Upon reaching a node with a copy on write flag, saving component 107 can save the state of the node's parent node to the recovery node associated with the copy on write flag. Upon reaching a leaf node within the serialized path of computational nodes, simulation component 110 can save or output the state of the leaf node. If the leaf node has an edge leading to a recovery node, serialization component 105 can then begin forward computations at the recovery node.

In the above examples, it should be appreciated that parameter circuit serialization system 101 can provide improvements to parameter circuit resource consumption and/or simulation time by identifying and taking advantage of common parameters in order to avoid duplicate simulation of common parameters. In an example, in generating the parameter tree from parameter sets, parameter circuit serialization system 101 can identify duplicate computational paths between two or more parameter sets. In this example, by identifying duplicate computational paths, parameter circuit serialization system 101 can facilitate the elimination and/or reduction of the duplicated computations in order to reduce overall simulation time. In another example, parameter circuit serialization system 101 can determine a first path of computational nodes and a second path of computational nodes in a parameter tree comprising a plurality of computational nodes. Parameter circuit serialization system 101 can create a serialized path of computational nodes from the first path of computational nodes and the second path of computational nodes. In the examples above, it should be appreciated that parameter circuit serialization system 101 can reduce or eliminate duplicate computations in simulations of parameter sets of parameterized circuits. For example, by creating a serialized path from the first path of computational nodes and the second path of computational nodes, parameter circuit serialization system can take advantage of shared computational paths in the first path of computational nodes and the second path of computational nodes when performing simulations.

Parameter circuit serialization system 101 can provide technical improvements to a processing unit associated with parameter circuit serialization system 101. For example, in creating the above described serialized path of computational nodes, parameter circuit serialization system 101 can decrease the overall number of computations needed to simulate multiple parameter sets, thereby reducing the workload of a processing unit (e.g., processor 103) that is employed to execute the routines (e.g., instructions and/or processing threads) of such computations. In this example, by reducing the workload of such a processing unit (e.g., processor 103), parameter circuit serialization system 101 can thereby facilitate improved performance, improved efficiency, and/or reduced computational cost associated with such a processing unit.

A practical application of parameter circuit serialization system 101 is that it can be implemented for use in VQE applications or the Qiskit simulation architecture. For example, a practical application of parameter circuit serialization system 101 is that if can be implemented for use in the parameterized circuits used in VQE applications and the Qiskit simulation architecture to decrease overall simulation time. For instance, by decreasing overall simulation time in VQE applications and the Qiskit simulation architecture, research time involving VQE applications or the Qiskit simulation architecture can be decreased.

Parameter circuit serialization system 101 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, and/or another type of specialized computer) to execute defined tasks related to the various technologies identified above. Parameter circuit serialization system 101 and/or components thereof, can be employed to solve new problems that arise through advancements in technologies mentioned above, employment of quantum computing systems, cloud computing systems, computer architecture, and/or another technology.

It is to be appreciated that parameter circuit serialization system 101 can utilize various combinations of electrical components, mechanical components, and circuitry that cannot be replicated in the mind of a human or performed by a human, as the various operations that can be executed by parameter circuit serialization system 101 and/or components thereof as described herein are operations that are greater than the capability of a human mind. For instance, the amount of data processed, the speed of processing such data, or the types of data processed by parameter circuit serialization system 101 over a certain period of time can be greater, faster, or different that the amount, speed, or data type that can be processed by a human mind over the same period of time. According to several embodiments, parameter circuit serialization system 101 can also be fully operational toward performing one or more other functions (e.g., fully powered on, fully executed, and/or another function) while also performing various operations described herein. It should be appreciated that such simultaneous multi-operational execution is beyond the capability of a human mind.

For simplicity of explanation, the computer-implemented and methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 12:
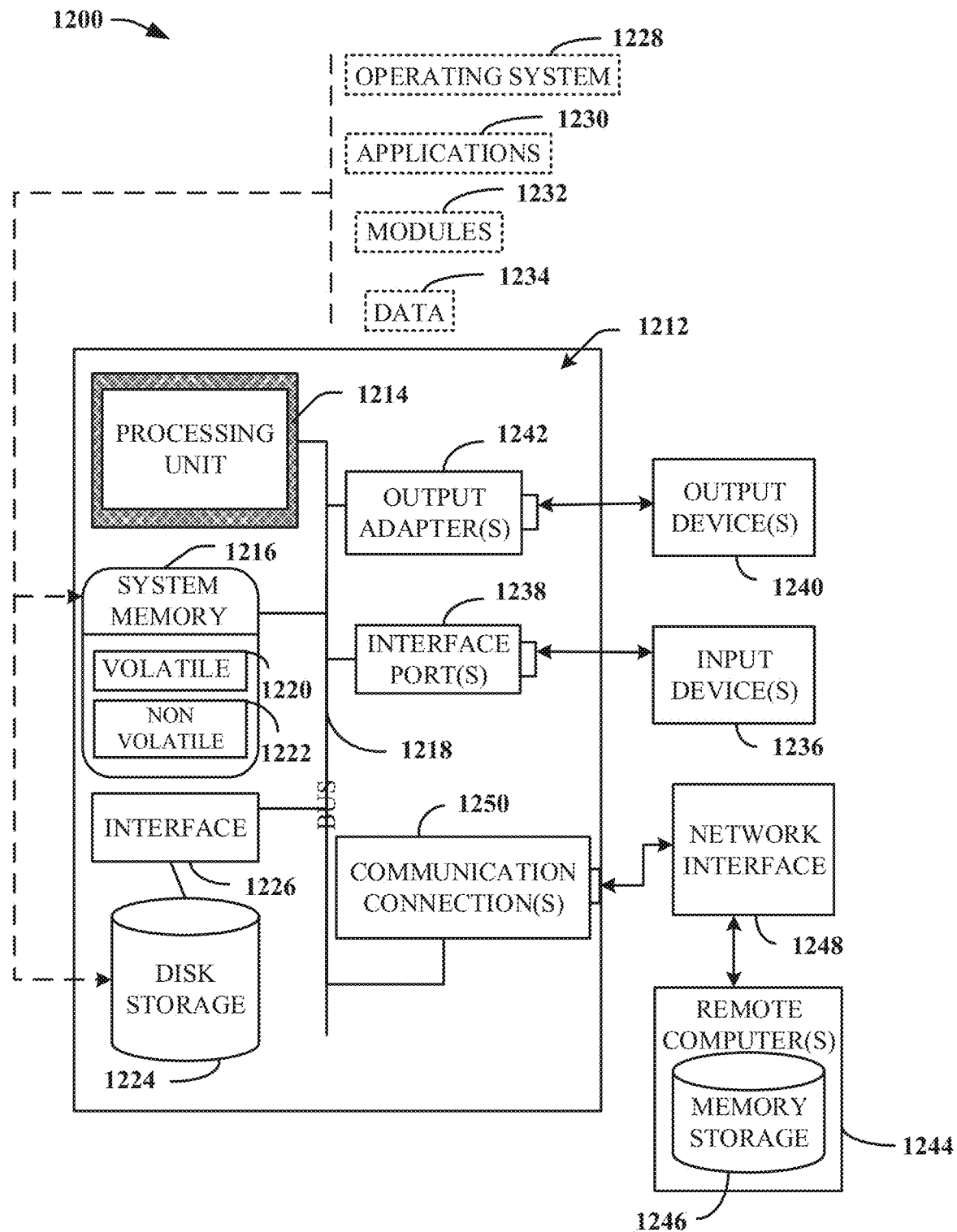
FIG. 12 illustrates a block diagram of an example, non-limiting operating environment in which one or more embodiments described herein can be facilitated.

In order to provide a context for the various aspects of the disclosed subject matter, FIG. 12 as well as the following discussion are intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity.

With reference to FIG. 12, a suitable operating environment 1200 for implementing various aspects of this disclosure can also include a computer 1212. The computer 1212 can also include a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1216 can also include volatile memory 1220 and nonvolatile memory 1222. The basic input/output system (BIOS), containing the basic routines to transfer information between elements within the computer 1212, such as during start-up, is stored in nonvolatile memory 1222. Computer 1212 can also include removable/non-removable, volatile/non-volatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media. To facilitate connection of the disk storage 1224 to the system bus 1218, a removable or non-removable interface is typically used, such as interface 1226. FIG. 12 also depicts software that acts as an intermediary between users and the basic computer resources described in the suitable operating environment 1200. Such software can also include, for example, an operating system 1228. Operating system 1228, which can be stored on disk storage 1224, acts to control and allocate resources of the computer 1212.

System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port can be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a computer, a server, a router, a network PC, a workstation, a microprocessor based appliance, a peer device or other common network node and the like, and typically can also include many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, and/or another wire and/or wireless communication network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, handheld computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining, by a system operatively coupled to a processor, a first path of computational nodes and a second path of computational nodes of a parameter tree representing one or more quantum circuits, wherein the parameter tree comprises a plurality of computational nodes, wherein the first path of computational nodes and the second path of computational nodes share one or more computational nodes at the beginning of the first path of computational nodes and the second path of computational nodes, wherein each depth of the parameter tree is labeled with a respective estimated resource consumption of resources of a simulation system to reach the depth, and wherein the resources comprise at least one processor and at least one memory;
   creating, by the system, a recovery node representing a shared node between the first path of computational nodes and the second path of computational nodes;
   creating, by the system, a serialized path of computational nodes from the first path of computational nodes and the second path of computational nodes based on the respective estimated resource consumption for each depth of the parameter tree, wherein the serialized path of computational nodes eliminates one or more duplicate simulation computations and has a first estimated resource consumption that is less than a second estimated resource consumption of another serialized path created from the first path of computational nodes and the second path of computational nodes that does not eliminate the one or more duplicate simulation computations; and
   executing, by the system, using the simulation system, a quantum circuit simulation on the serialized path of computational nodes.

2. The computer-implemented method of claim 1, wherein the parameter tree further represents a plurality of computational paths of the plurality of computational nodes in the one or more quantum circuits.

3. The computer-implemented method of claim 1, further comprising:
   generating, by the system, the parameter tree comprising the plurality of computational nodes.

4. The computer-implemented method of claim 1, wherein the serialized path of computational nodes is created by adding one or more backwards edges from an endpoint of the first path of computational nodes to the shared node of the first path of computational nodes and the second path of computational nodes.

5. The computer-implemented method of claim 1, wherein the serialized path of computational nodes is created by adding an edge from an endpoint of the first path of computational nodes to the recovery node, wherein the recovery node is connected to the second path of computational nodes at a child node of the shared node.

6. A computer program product, the computer program product comprising one or more non-transitory computer readable media having program instructions embodied therewith, the program instructions executable by a processor to cause the processor to:
   determine a first path of computational nodes and a second path of computational nodes of a parameter tree representing one or more quantum circuits, wherein the parameter tree comprises a plurality of computational nodes, wherein the first path of computational nodes and the second path of computational nodes share one or more computational nodes at the beginning of the first path of computational nodes and the second path of computational nodes, wherein each depth of the parameter tree is labeled with a respective estimated resource consumption of resources of a simulation system to reach the depth, and wherein the resources comprise at least one processor and at least one memory;
   create a recovery node representing a shared node between the first path of computational nodes and the second path of computational nodes;
   create a serialized path of computational nodes from the first path of computational nodes and the second path of computational nodes based on the respective estimated resource consumption for each depth of the parameter tree, wherein the serialized path of computational nodes eliminates one or more duplicate simulation computations and has a first estimated resource consumption that is less than a second estimated resource consumption of another serialized path created from the first path of computational nodes and the second path of computational nodes that does not eliminate the one or more duplicate simulation computations; and execute, using the simulation system, a quantum circuit simulation on the serialized path of computational nodes.

7. The computer program product of claim 6, wherein the parameter tree further represents a plurality of computational paths of the plurality of computational nodes in the one or more quantum circuits.

8. The computer program product of claim 6, wherein the program instructions are further executable by the processor to cause the processor to:

generate, by the processor, the parameter tree comprising the plurality of computational nodes.

9. The computer program product of claim 6, wherein the serialized path of computational nodes is created by adding backwards edges from an endpoint of the first path of computational nodes to the shared node of the first path of computational nodes and the second path of computational nodes.

10. The computer program product of claim 6, wherein the serialized path of computational nodes is created by adding an edge from an endpoint of the first path of computational nodes to the recovery node, wherein the recovery node is connected to the second path of computational nodes at a child node of the shared node.

11. A system comprising:

a memory that stores computer executable components:

a processor that executes at least one of the computer executable components that:

determines a first path of computational nodes and a second path of computational nodes of a parameter tree representing one or more quantum circuits, wherein the parameter tree comprises a plurality of computational nodes, wherein the first path of computational nodes and the second path of computational nodes share one or more computational nodes at the beginning of the first path of computational nodes and the second path of computational nodes, wherein each depth of the parameter tree is labeled with a respective estimated resource consumption of resources of a simulation system to reach the depth, and wherein the resources comprise at least one processor and at least one memory;

creates a recovery node representing a shared node between the first path of computational nodes and the second path of computational nodes;

creates a serialized path of computational nodes from the first path of computational nodes and the second path of computational nodes based on the respective estimated resource consumption for each depth of the parameter tree, wherein the serialized path of computational nodes eliminates one or more duplicate simulation computations and has a first estimated resource consumption that is less than a second estimated resource consumption of another serialized path created from the first path of computational nodes and the second path of computational nodes that does not eliminate the one or more duplicate simulation computations; and executes, using the simulation system, a quantum circuit simulation on the serialized path of computational nodes.

12. The system of claim 11, wherein the parameter tree further represents a plurality of computational paths of the plurality of computational nodes in the one or more quantum circuits.

13. The system of claim 11, wherein the serialized path of computational nodes is created by adding backwards edges from an endpoint of the first path of computational nodes to the shared node of the first path of computational nodes and the second path of computational nodes.

14. The system of claim 11, wherein the serialized path of computational nodes is created by adding an edge from an endpoint of the first path of computational nodes to the recovery node, wherein the recovery node is connected to the second path of computational nodes at a child node of the shared node.

15. The system of claim 11, wherein each computational node of the parameter tree is labeled with a respective estimated resource consumption of the resources of the simulation system to reach the computational node.

16. The system of claim 15, wherein the serialized path of computational nodes is created based further on the respective estimated resource consumption of each computational node of the parameter tree.

17. The computer-implemented method of claim 1, wherein each computational node of the parameter tree is labeled with a respective estimated resource consumption of the resources of the simulation system to reach the computational node.

18. The computer-implemented method of claim 17, wherein the serialized path of computational nodes is created based further on the respective estimated resource consumption of each computational node of the parameter tree.

19. The computer program product of claim 6, wherein each computational node of the parameter tree is labeled with a respective estimated resource consumption of the resources of the simulation system to reach the computational node.

20. The computer program product of claim 19, wherein the serialized path of computational nodes is created based further on the respective estimated resource consumption of each computational node of the parameter tree.

* * * * *